(12) United States Patent
Ferren et al.

(10) Patent No.: US 9,769,534 B2
(45) Date of Patent: Sep. 19, 2017

(54) TECHNIQUES TO CUSTOMIZE A MEDIA PROCESSING SYSTEM

(75) Inventors: Bran Ferren, Beverly Hills, CA (US);
Cory J. Booth, Beaverton, OR (US);
Genevieve Bell, Portland, OR (US);
David B. Andersen, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 907 days.

(21) Appl. No.: 13/819,303

(22) PCT Filed: Aug. 26, 2011

(86) PCT No.: PCT/US2011/049291
§ 371 (c)(1),
(2), (4) Date: Jul. 11, 2013

(87) PCT Pub. No.: WO2012/027643
PCT Pub. Date: Mar. 1, 2012

(65) Prior Publication Data
US 2013/0290233 A1 Oct. 31, 2013

Related U.S. Application Data

(60) Provisional application No. 61/377,588, filed on Aug. 27, 2010.

(51) Int. Cl.
*G06F 17/00* (2006.01)
*G06N 5/02* (2006.01)
(Continued)

(52) U.S. Cl.
CPC ............ *H04N 21/632* (2013.01); *G01S 5/20* (2013.01); *G06F 3/017* (2013.01); *G06F 3/0346* (2013.01); *G06F 3/0383* (2013.01); *G06F 3/041* (2013.01); *G06F 3/048* (2013.01); *G06F 3/0414* (2013.01); *G06F 3/0481* (2013.01); *G06F 3/0482* (2013.01); *G06F 3/0485* (2013.01);
(Continued)

(58) Field of Classification Search
None
See application file for complete search history.

(56) References Cited

U.S. PATENT DOCUMENTS

2002/0166119 A1 11/2002 Cristofalo
2002/0174426 A1* 11/2002 Gutta .................... G11B 19/08
725/30

(Continued)

FOREIGN PATENT DOCUMENTS

WO 0156269 8/2001
WO 0232136 4/2002

OTHER PUBLICATIONS

Office Action received for Korean Patent Application No. 2013-7007844, mailed Mar. 7, 2014, 3 pages English translation.
(Continued)

*Primary Examiner* — Li-Wu Chang

(57) ABSTRACT

Techniques to customize a media processing system are described. A media processing system is described capable of integrating a large set of heterogeneous electronic devices into a single integrated system with enhanced navigation capabilities and automated configuration services. Other embodiments are described and claimed.

38 Claims, 26 Drawing Sheets

(51) Int. Cl.
| | |
|---|---|
| H04N 21/63 | (2011.01) |
| H04N 21/437 | (2011.01) |
| G06F 3/041 | (2006.01) |
| H04N 21/422 | (2011.01) |
| H04N 21/45 | (2011.01) |
| G06K 9/32 | (2006.01) |
| H04N 5/445 | (2011.01) |
| H04N 21/431 | (2011.01) |
| H04N 21/654 | (2011.01) |
| G08C 17/00 | (2006.01) |
| G08C 17/02 | (2006.01) |
| G08C 19/00 | (2006.01) |
| G06F 3/048 | (2013.01) |
| G01S 5/20 | (2006.01) |
| H04N 21/488 | (2011.01) |
| H04N 5/91 | (2006.01) |
| H04N 5/44 | (2011.01) |
| G06F 3/0485 | (2013.01) |
| H04L 29/06 | (2006.01) |
| G06Q 30/02 | (2012.01) |
| H04N 21/436 | (2011.01) |
| H04N 21/443 | (2011.01) |
| G06F 3/01 | (2006.01) |
| G06F 3/038 | (2013.01) |
| G06F 3/0482 | (2013.01) |
| G06F 3/0481 | (2013.01) |
| H04N 21/482 | (2011.01) |
| G06F 3/0346 | (2013.01) |
| H04N 21/4147 | (2011.01) |
| H04N 21/433 | (2011.01) |
| H04N 21/81 | (2011.01) |
| H04N 21/475 | (2011.01) |

(52) U.S. Cl.
CPC ............ *G06K 9/3266* (2013.01); *G06N 5/02* (2013.01); *G06Q 30/0201* (2013.01); *G08C 17/00* (2013.01); *G08C 17/02* (2013.01); *G08C 19/00* (2013.01); *H04L 65/403* (2013.01); *H04N 5/4403* (2013.01); *H04N 5/44504* (2013.01); *H04N 5/91* (2013.01); *H04N 21/4147* (2013.01); *H04N 21/42204* (2013.01); *H04N 21/42222* (2013.01); *H04N 21/437* (2013.01); *H04N 21/4312* (2013.01); *H04N 21/4333* (2013.01); *H04N 21/43615* (2013.01); *H04N 21/4432* (2013.01); *H04N 21/4436* (2013.01); *H04N 21/4508* (2013.01); *H04N 21/4516* (2013.01); *H04N 21/4532* (2013.01); *H04N 21/482* (2013.01); *H04N 21/4882* (2013.01); *H04N 21/63* (2013.01); *H04N 21/654* (2013.01); *G08C 2201/32* (2013.01); *G08C 2201/40* (2013.01); *H04N 21/4755* (2013.01); *H04N 21/8133* (2013.01); *H04N 2005/44556* (2013.01)

(56) References Cited

U.S. PATENT DOCUMENTS

| | | |
|---|---|---|
| 2002/0199188 A1 | 12/2002 | Sie et al. |
| 2004/0003392 A1 | 1/2004 | Trajkovic et al. |
| 2004/0117828 A1 | 6/2004 | Parker et al. |
| 2005/0138659 A1 | 6/2005 | Boccon-Gibod et al. |
| 2008/0092155 A1 | 4/2008 | Ferrone et al. |
| 2008/0092156 A1 | 4/2008 | Ferrone |
| 2008/0092170 A1* | 4/2008 | Shannon ............ H04N 5/44543 725/46 |
| 2008/0092173 A1 | 4/2008 | Shannon et al. |
| 2010/0211636 A1* | 8/2010 | Starkenburg ....... H04N 7/17318 709/203 |
| 2010/0333137 A1* | 12/2010 | Hamano ................ H04H 60/46 725/39 |
| 2011/0099263 A1* | 4/2011 | Patil ...................... G06Q 50/01 709/224 |
| 2011/0145050 A1* | 6/2011 | Gross .................... G06Q 10/10 705/14.25 |

OTHER PUBLICATIONS

International Search Report and Written Opinion received for PCT Patent Application No. PCT/US2011/049291, mailed Mar. 27, 2012, 12 pages.

Extended European Search Report received for European Patent Application No. 11820707.5, mailed Feb. 25, 2015, 9 pages.

* cited by examiner

800

IDENTIFY A USER OF A MEDIA PROCESSING DEVICE
802

MONITOR ONLINE ACTIVITY OF THE USER WHEN USING MULTIPLE HETEROGENEOUS MEDIA SOURCES ACCESSIBLE BY THE MEDIA PROCESSING DEVICE
804

DETERMINE IMPLICIT VIEWING PREFERENCES OF THE USER FROM THE MONITORED ACTIVITY
806

STORE THE IMPLICIT VIEWING PREFERENCES IN A USER PROFILE FOR THE USER
808

- IDENTIFY FIRST AND SECOND USERS OF A MEDIA PROCESSING DEVICE
  *1502*

- RETRIEVE FIRST AND SECOND USER PROFILES ASSOCIATED WITH THE RESPECTIVE FIRST AND SECOND USERS
  *1504*

- SELECT FIRST AND SECOND SETS OF MEDIA OBJECTS FOR MULTIPLE HETEROGENEOUS MEDIA SOURCES ACCESSIBLE BY THE MEDIA PROCESSING DEVICE BASED ON THE RESPECTIVE FIRST AND SECOND USER PROFILES
  *1506*

- COMBINE THE FIRST AND SECOND SETS OF MEDIA OBJECTS INTO A COMBINED SET OF MEDIA OBJECTS
  *1508*

- RETRIEVE MEDIA INFORMATION FOR ONE OR MORE MEDIA OBJECTS FROM THE COMBINED SET OF MEDIA OBJECTS
  *1510*

- GENERATE A CUSTOM USER INTERFACE VIEW WITH THE COMBINED SET OF MEDIA OBJECTS AND ASSOCIATED MEDIA INFORMATION
  *1512*

- IDENTIFY A USER OF A MEDIA PROCESSING DEVICE
  2002

- RETRIEVE A USER PROFILE ASSOCIATED WITH THE USER
  2004

- SELECT A SET OF PROGRAMS PROVIDED BY MULTIPLE HETEROGENEOUS MEDIA SOURCES ACCESSIBLE BY THE MEDIA PROCESSING DEVICE BASED ON THE USER PROFILE
  2006

- ORGANIZE THE SET OF PROGRAMS INTO A SEQUENTIAL LIST OF PROGRAMS BASED ON A DEFINED ORDER
  2008

- SEND CONTROL DIRECTIVES TO ONE OR MORE MEDIA SOURCES TO PRESENT THE SEQUENTIAL LIST OF PROGRAMS AS A STREAM OF PROGRAMS ON AN ELECTRONIC DISPLAY IN ACCORDANCE WITH THE DEFINED ORDER
  2010

FIG. 20

TECHNIQUES TO CUSTOMIZE A MEDIA PROCESSING SYSTEM

RELATED APPLICATIONS

This application claims priority to U.S. Provisional Patent Application Ser. No. 61/377,588 filed Aug. 27, 2010, which is incorporated herein by reference in its entirety.

BACKGROUND

A modern home features a plethora of electronic devices. For instance, a home entertainment system may include electronic media devices such as a digital flat-screen television, an audio sound system, a gaming system, and a media server, all of which are loosely tied together via a central component, such as a media set top box (STB) or audio/visual (AV) receiver. Aside from the home entertainment system, a typical household may have various electronic consumer appliances such as a home security system, a home fire system, a home automation system, and smart consumer appliances. Meanwhile, each family member may have various electronic computing and/or communications devices, such as a notebook computer, a smart phone, and portable audio device, with a few desktop computers thrown into the mix. Some or all of these electronic devices may have networking capabilities, thereby allowing these devices to form an ad hoc home network via a wireless router.

Several major design considerations come along with this highly diverse and largely heterogeneous set of electronic devices. First, these electronic devices are typically made by different manufacturers, and as such, have limited native interoperability. Second, each electronic device typically requires a separate user interface to navigate and control functionality provided by a given device. Third, while some electronic devices may be somewhat configurable to suite an individual user, many of the configuration operations are manual in nature requiring a user to consciously program any desired options.

Accordingly, there may be a need for improved techniques to integrate a large set of heterogeneous electronic devices into a single integrated system with enhanced navigation capabilities and automated configuration services that solves these and other problems.

BRIEF DESCRIPTION OF THE DRAWINGS

FIG. 8 illustrates one embodiment of a first logic flow.

FIG. 15 illustrates one embodiment of a third logic flow.

FIG. 20 illustrates one embodiment of a fourth logic flow.

DETAILED DESCRIPTION

Figure 1:
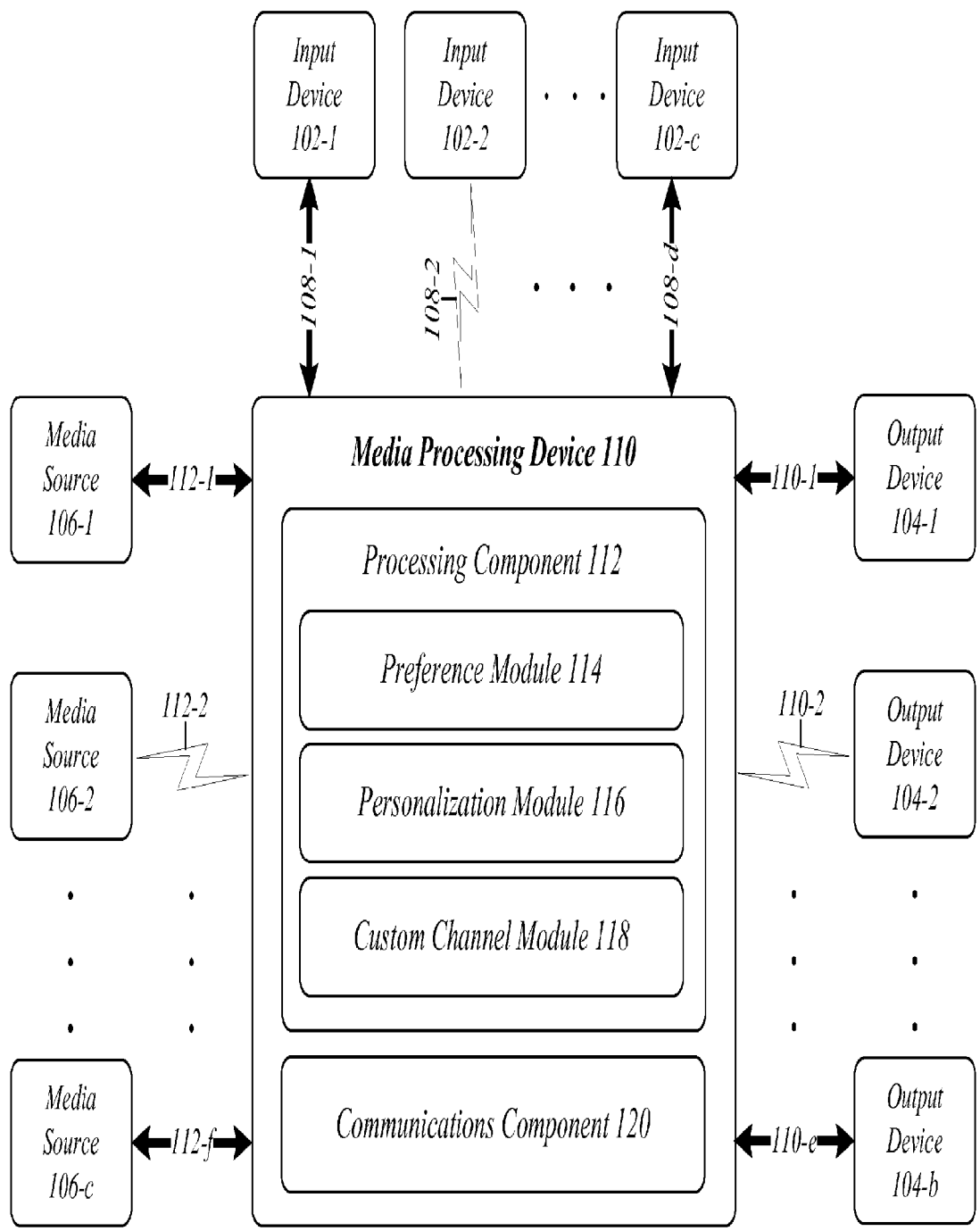
FIG. 1 illustrates one embodiment of a media processing system.

Consumer electronics, processing systems and communications systems are converging. For instance, consumer electronics such as digital televisions and media centers are evolving to include processing capabilities typically found on a computer and communications capabilities typically found in mobile devices. As such, heterogeneous consumer electronics continue to evolve into a single integrated system, sometimes referred to as a "digital home system."

A digital home system may be arranged to provide a compelling entertainment environment in which a user can move seamlessly between television viewing, internet access, and home media management in various embodiments. In some embodiments, a single flexible and dynamic interface may allow a user to find the television programming that they wish to view, acquire the information that they seek from the Web, or enjoy personal audio files, photos, and movies. The system may also facilitate enhanced television viewing, enable collaborative interaction with family and friends, and securely execute financial transactions. A digital home system may provide these features while retaining the familiar design sensibilities and ease-of-use of a traditional television.

In various embodiments, a digital home system may address common deficiencies associated with current entertainment systems in which access to television programming, the internet, and personal media requires operation of three separate interfaces. For example, a unified interface of the digital home system may incorporate physical and graphical elements tied to an easily understood underlying organizational framework, making a home entertainment experience more interesting, compelling, engaging, and efficient. A unified interface may combine the best aspects of the three integrated paradigms, e.g., those of television, internet, and computers. For example, elements such as animation, information-rich displays, and video and audio cues from traditional televisions and television menus may be incorporated into the unified interface. Similarly, seamless integration of different forms of content and communications mechanisms from traditional internet experiences, allowing links from one form of content to another and providing tools such as messaging and video conferencing may also be incorporated. And from computers, point-and-click mechanisms that allow effective navigation of complex information spaces may also be part of the unified interface of the digital home system in various embodiments.

The digital home system may utilize, in some embodiments, a visual display such as a television display as a navigation device. Using the display in combination with any number of remote control devices, a user can carry out complex tasks in fulfilling and transformative ways. The digital home system may include familiar mechanisms such as on-screen programming guides, innovative technologies that facilitate navigation via natural motions and gestures and context-sensitivity that understands the user and the options available to the user which all combine to make the digital home system experience intuitive and efficient as it empowers the user to utilize multiple devices in a seamlessly integrated way.

For a typical television-viewing, media-perusing, and web-browsing home user, the digital home system may be arranged to provide a unified home entertainment experience, allowing the user to freely navigate through television, media, and internet offerings from a traditional viewing position (such as a sofa) using a unified interface. In some embodiments, the unified interface integrates the information provided by a diverse array of devices and services into the existing television or other display in a functionally seamless and easily understood manner.

The digital home system may include, in various embodiments, a multi-axis integrated on-screen navigation allowing the display screen to be used for navigation as well as for the presentation of content. In some embodiments, the digital home system may also include a user interface engine operative to provide context-sensitive features and overlays intelligently integrated with the underlying content and adaptive to the viewing environment. A family of remote control and other input/output device may also be incorporated into the digital home system in various embodiments to further enhance the intuitive user interactions, ease of use and overall quality of the system. The embodiments are not limited in this context.

Various embodiments are directed to techniques to customize media content for a media system, such as a digital home system, among others. Some embodiments are particularly directed to customizing various types of media content from different media sources for one or more users. As a result, such customization may enhance media navigation, media selection, and media consumption by one or more users of the media system.

In one embodiment, a set of techniques may be implemented to automatically and programmatically create a user profile for a user with individualized viewing preferences by observing viewing patterns and other user behavior. For instance, techniques are implemented to identify a user of a media processing device, monitor activity of the user when using multiple heterogeneous media sources accessible by the media processing device, determine implicit viewing preferences of the user from the monitored activity, and store the implicit viewing preferences in a user profile for the user. Additionally or alternatively, a graphical user interface (GUI) tool may be used to define explicit viewing preferences. The implicit and explicit viewing preferences may be used as inputs to create viewing recommendations, custom user interface views, custom programming channels, and other personalized content for a user.

In one embodiment, a set of techniques may be implemented to create a custom user interface view for an individual user. For instance, techniques are implemented to select a set of media objects for multiple heterogeneous media sources accessible by a media processing device based on a set of user preferences stored in a user profile, retrieve media information for one or more of the selected media objects, and generate a custom user interface view for the user with the set of media objects and associated media information. The custom user interface view becomes an individualized home entertainment portal welcome page that can be presented whenever a single user is using a digital home system.

In one embodiment, a set of techniques may be implemented to create a custom user interface view for multiple users. For instance, techniques are implemented to select multiple sets of media objects for multiple heterogeneous media sources accessible by a media processing device based on multiple user profiles, combine the multiple sets of media objects into a combined set of media objects, retrieve media information for media objects from the combined set of media objects, and generate a custom user interface view with the combined set of media objects and associated media information. The custom interface view becomes a combined home entertainment portal welcome page that can be presented whenever multiple users are using a digital home system.

In one embodiment, a set of techniques may be implemented to create a custom programming channel for one or more users. For instance, techniques are implemented to select a set of programs provided by multiple heterogeneous media sources accessible by a media processing device based on a user profile for the user, organize the set of programs into a sequential list of programs based on a defined order, and send control directives to one or more media sources to present the sequential list of programs as a stream of programs on an electronic display in accordance with the defined order. The custom programming channel can be accessible via a custom user interface view, and selected by one or more users to watch a selectable and/or continuous stream of programs specifically designed according to a set of user preferences whenever the one or more users are using a digital home system.

These and other techniques allow users to consume personalized media content automatically collected by a digital home system, thereby reducing an amount of time users need to search for desired media content. This becomes particularly important as the number of media sources and types of media content increase, thereby creating a rapidly growing number of choices for users. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a media processing system 100. The media processing system 100 is generally directed to performing media processing operations for media content in accordance with any associated control signaling necessary for presenting media content on an output device. In one embodiment, the media processing system 100 is particularly arranged to provide media content from disparate media sources to viewers in a home environment, such as a digital home system, for example. However, the media processing system 100 may be suitable for any use scenarios involving presentation and display of media content. Although the media processing system 100 shown in FIG. 1 has a limited number of elements in a certain topology, it may be appreciated that the media processing system 100 may include more or less elements in alternate topologies as desired for a given implementation. The embodiments are not limited in this context.

In various embodiments, various elements of the media processing system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-Codec (VC-1) standards, the ITU/IEC H.263 and H.264 standards, and others. Another example may include various Digital Video Broadcasting (DVB) standards, such as the Digital Video Broadcasting Terrestrial (DVB-T) broadcasting standard, the DVB Satellite (DVB-S) broadcasting standard, the DVB Cable (DVB-C) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, elements of the media processing system 100 may be arranged to communicate, manage or process different types of information, such as media information and control information. Examples of media information may generally include any data or signals representing multimedia content meant for a user, such as media content, voice information, video information, audio information, image information, textual information, numerical information, alphanumeric symbols, graphics, and so forth. Control information may refer to any data or signals representing commands, instructions, control directives or control words meant for an automated system. For example, control information may be used to route media information through a system, to establish a connection between devices, instruct a device to process the media information in a predetermined manner, monitor or communicate status, perform synchronization, and so forth. The embodiments are not limited in this context.

In various embodiments, media processing system 100 may be implemented as a wired communication system, a wireless communication system, or a combination of both. Although media processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the media processing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the media processing system 100 may include one or more wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, the media processing system 100 may comprise a media processing device 110. The media processing device 110 may further comprise one or more input devices 102-a, one or more output devices 104-b, and one or more media sources 106-c. The media processing device 110 may be communicatively coupled to the input devices 102-a, the output devices 104-b, and the media sources 106-c via respective wireless or wired communications connections 108-d, 110-e and 112-f.

It is worthy to note that "a" and "b" and "c" and similar designators as used herein are intended to be variables representing any positive integer. Thus, for example, if an implementation sets a value for a=5, then a complete set of input devices 102-a may include computing devices 102-1, 102-2, 102-3, 102-4 and 102-5. The embodiments are not limited in this context.

In various embodiments, the media processing system 100 may include one or more input devices 102-a. In general, each input device 102-a may comprise any component or device capable of providing information to the media processing device 110. Examples of input devices 102-*a* may include without limitation remote controls, pointing devices, keyboards, keypads, trackballs, trackpads, touchscreens, joysticks, game controllers, sensors, biometric sensors, thermal sensors, motion sensors, directional sensors, microphones, microphone arrays, video cameras, video camera arrays, global positioning system devices, mobile computing devices, laptop computers, desktop computers, handheld computing devices, tablet computing devices, netbook computing devices, smart phones, cellular telephones, wearable computers, and so forth. The embodiments are not limited in this context.

In various embodiments, the media processing system 100 may include one or more output devices 104-*b*. An output device 104-*b* may comprise any electronic device capable of reproducing, rendering or presenting media content for consumption by a human being. Examples of output devices 104-*b* may include without limitation a display, an analog display, a digital display, a television display, audio speakers, headphones, a printing device, lighting systems, warning systems, mobile computing devices, laptop computers, desktop computers, handheld computing devices, tablet computing devices, netbook computing devices and so forth. The embodiments are not limited in this context.

While various embodiments refer to input devices 102-*a* providing information to media processing device 110 and output devices 104-*b* receiving information from media processing device, it should be understood that one or more of the input devices 102-*a* and output device 104-*b* may allow for the exchange of information to and from media processing device 110 via their respectively connections 108-*d* and 110-*e*. For example, one or more of input devices 102-*a* may be operative to provide information to media processing device 110 and to receive information from media processing device 110. In various embodiments, one or more of output devices 104-*b* may be operative to receive information from media processing device 110 and may also be operative to provide information to media processing device 110. Similarly, there may be a bi-directional exchange between the media processing device 110 and media sources 106-*c*. For instance, a media source 106-*c* may be operative to provide media information to the media processing device 110 and to receive information from the media processing device 110. An example of this would be a video on demand (VOD) application implemented by the media processing device 110. The embodiments are not limited in this context.

In one embodiment, for example, the media processing system 100 may include a display 104-1. The display 104-1 may comprise any analog or digital display capable of presenting media information received from media sources 106-*c*. The display 104-1 may display the media information at a defined format resolution. In various embodiments, for example, the incoming video signals received from media sources 106-*c* may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720 p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context. The type of displays and format resolutions may vary in accordance with a given set of design or performance constraints, and the embodiments are not limited in this context.

In various embodiments, the media processing system 100 may include one or more media sources 106-*c*. Media sources 106-*c* may comprise any media source capable of sourcing or delivering media information and/or control information to media processing device 110. More particularly, media sources 106-*c* may comprise any media source capable of sourcing or delivering digital audio and/or video (AV) signals to media processing device 110. Examples of media sources 106-*c* may include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, smart phones, tablets, notebooks, handheld computers, wearable computers, portable media players (PMP), portable media recorders (PMR), digital audio devices (e.g., MP3 players), digital media servers and so forth. Other examples of media sources 106-*c* may include media distribution systems to provide broadcast or streaming analog or digital AV signals to media processing device 110. Examples of media distribution systems may include, for example, Over The Air (OTA) broadcast systems, terrestrial cable systems (CATV), satellite broadcast systems, and so forth. It is worthy to note that media sources 106-*c* may be internal or external to media processing device 110, depending upon a given implementation. The embodiments are not limited in this context.

In various embodiments, the media processing system 100 may include one or more media processing devices 110. The media processing device 110 may comprise any electronic device arranged to receive, process, manage, and/or present media information received from media sources 106-*c*. In general, the media processing device 110 may include, among other elements, a processing system, a processing sub-system, a processor, a computer, a device, an encoder, a decoder, a coder/decoder (codec), a filtering device (e.g., graphic scaling device, deblocking filtering device), a transformation device, an entertainment system, a display, or any other processing or communications architecture. The embodiments are not limited in this context.

The media processing device 110 may execute processing operations or logic for the media processing system 100 using a processing component 112. The processing component 112 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The media processing device 110 may execute communications operations or logic for the media processing system 100 using communications component 120. The communications component 120 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 120 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication media 120 includes wired communications media and wireless communications media, as previously described.

In various embodiments, the media processing device 110 may comprise a preference module 114, a personalization module 116 and a custom channel module 118. The preference module 114, the personalization module 116 and the custom channel module 118 may be implemented by a logic device, such as software executing on the processing component 112, among other types of logic devices. The preference module 114, the personalization module 116 and the custom channel module 118 are all shown as part of media processing device 110 for purposes of illustration and not limitation. It should be understood that the preference module 114, the personalization module 116 and/or the custom channel module 118 could be located in other devices, components or nodes of media processing system 100 in various embodiments and still fall within the described embodiments.

Figure 2:
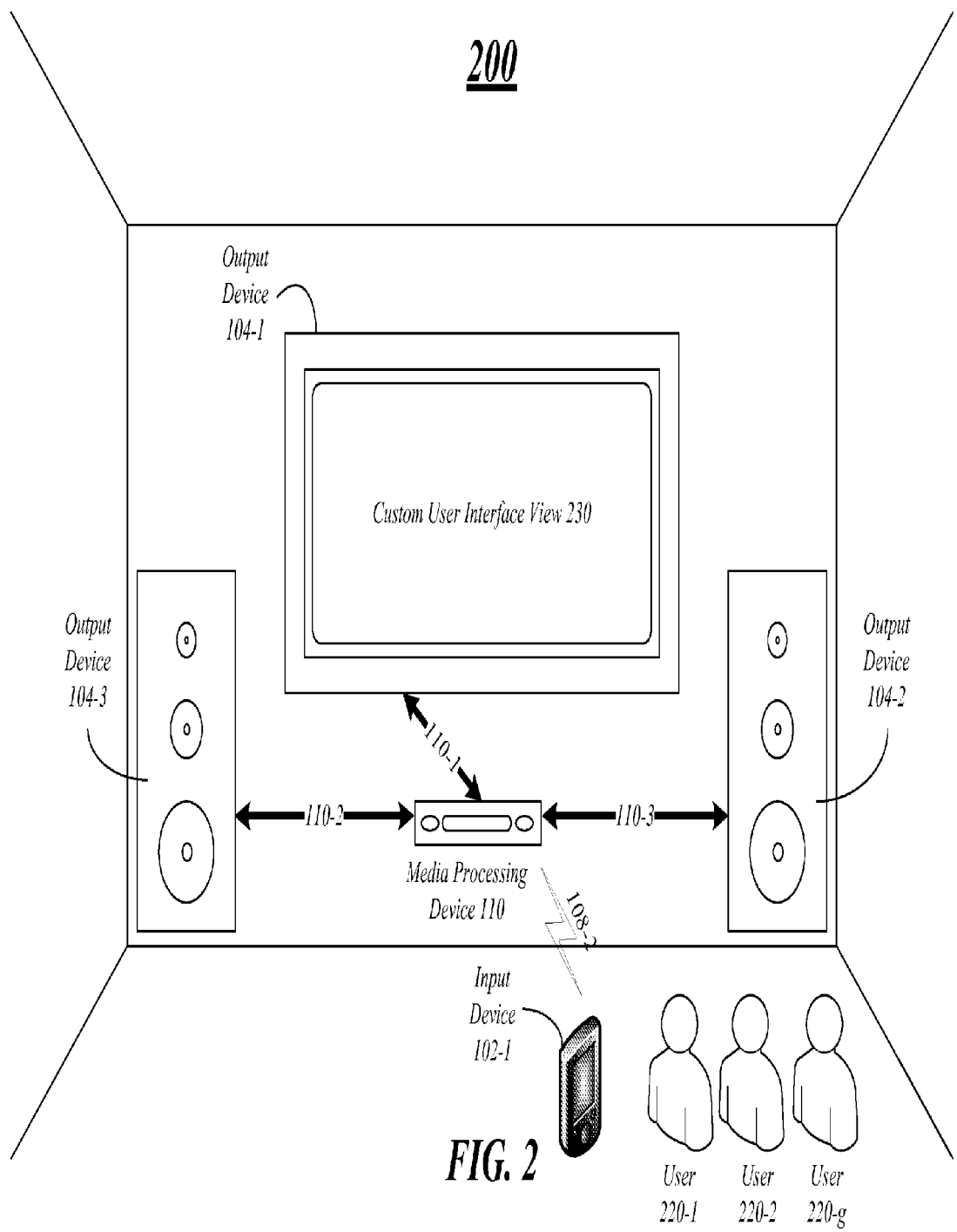
FIG. 2 illustrates one embodiment of a media processing component.

FIG. 2 illustrates a block diagram for a media processing system 200 that may be the same or similar to media processing system 100 of FIG. 1 where like elements are similarly numbered. The media processing system 200 may comprise a sample digital home system implementation that is arranged to provide media content from disparate media sources to users 220-g (e.g., viewers) in a home, office, or room environment. Although the media processing system 200 shown in FIG. 2 has a limited number of elements in a certain topology, it may be appreciated that the media processing system 200 may include more or less elements in alternate topologies as desired for a given implementation. The embodiments are not limited in this context.

In the illustrated embodiment shown in FIG. 2, the media processing system 200 may comprise a media processing device 110, input device 102-1, output devices 104-1, 104-2 and 104-3, and one or more media sources 106 (not shown). The media processing device 110 may be communicatively coupled to the input device 102-1, the output devices 104-1, 104-2 and 104-3, and the media sources 106 via respective wireless or wired communications connections 108-2, 110-1, 110-2 and 110-3. For purposes of illustration, the one or more media sources 106 of FIG. 2 (not shown) are part of, or integrated into, media processing device 110. Other embodiments are described and claimed.

In various embodiments, media processing device 110 may comprise a set-top box, digital media hub, media server, or other suitable processing device arranged to control the digital home system 200. While shown as a separate component in FIG. 2, it should be understood that media processing device 110 may be arranged as part of output device 104-1 or any other suitable component of system 200 in some embodiments. Output device 104-1 may comprise a digital television arranged to display information received from media processing device 110 over connection 110-1 in some embodiments. For instance, the output device 104-1 may present a custom user interface view 230 personalized for one or more of the users 220-g. In various embodiments, output devices 104-2 and 104-3 may comprise speakers arranged to reproduce audio or other acoustic signals received from media processing device 110 over connections 110-2 and 110-3 respectively. Input device 102-1 may comprise a remote control, smart phone, or other suitable processing device capable of communicating with media processing device 110, output device 104-1 or any other device in the digital home system 200. Together, each of the components, nodes or devices of media processing system 200 may form or comprise one example embodiment of digital home entertainment system. The embodiments are not limited to the type, number or arrangement of components illustrated in FIG. 2.

In various embodiments, the preference module 114, the personalization module 116 and/or the custom channel module 118 generally implements techniques to customize media content (or media information) for the media processing system 100. In some embodiments, the preference module 114, the personalization module 116 and/or the custom channel module 118 may customize various types of media content from different media sources for one or more users. In one embodiment, the preference module 114, the personalization module 116 and the custom channel module 118 are designed to operate independently from each other as stand-alone applications. In one embodiment, the preference module 114, the personalization module 116 and/or the custom channel module 118 are designed to interoperate with each other as integrated applications. The embodiments are not limited in this context.

Individual Viewing Recommendations

The media processing system 100 may be generally arranged to deduce viewing preferences for one or more users by observing viewing patterns and behaviors. Inputs to such deduction algorithms may include without limitation actual television programs watched, online activity (e.g., such as participation in an online science-fiction community), data mining and collaborative filtering from online recommendations (e.g., from others who have watched similar programs), explicitly articulated user preferences (e.g. "I don't want sports, ever"), and indirect user preferences (e.g., identifying specific "friends" who may have similar tastes). The media processing system 110 may identify an individual user (in the case of a shared television environment) by use of personal remote control devices, a log-in procedure (e.g. a username and password or simple identification key [e.g., user number 1, 2, etc.]), visual recognition, or inference (e.g. watching user behaviors such as program selection, typical viewing times, and patterns of activity). The media processing system 100 may then be capable of providing custom viewing recommendations for a user of the media processing system 100, among other potential use scenarios.

Figure 3:
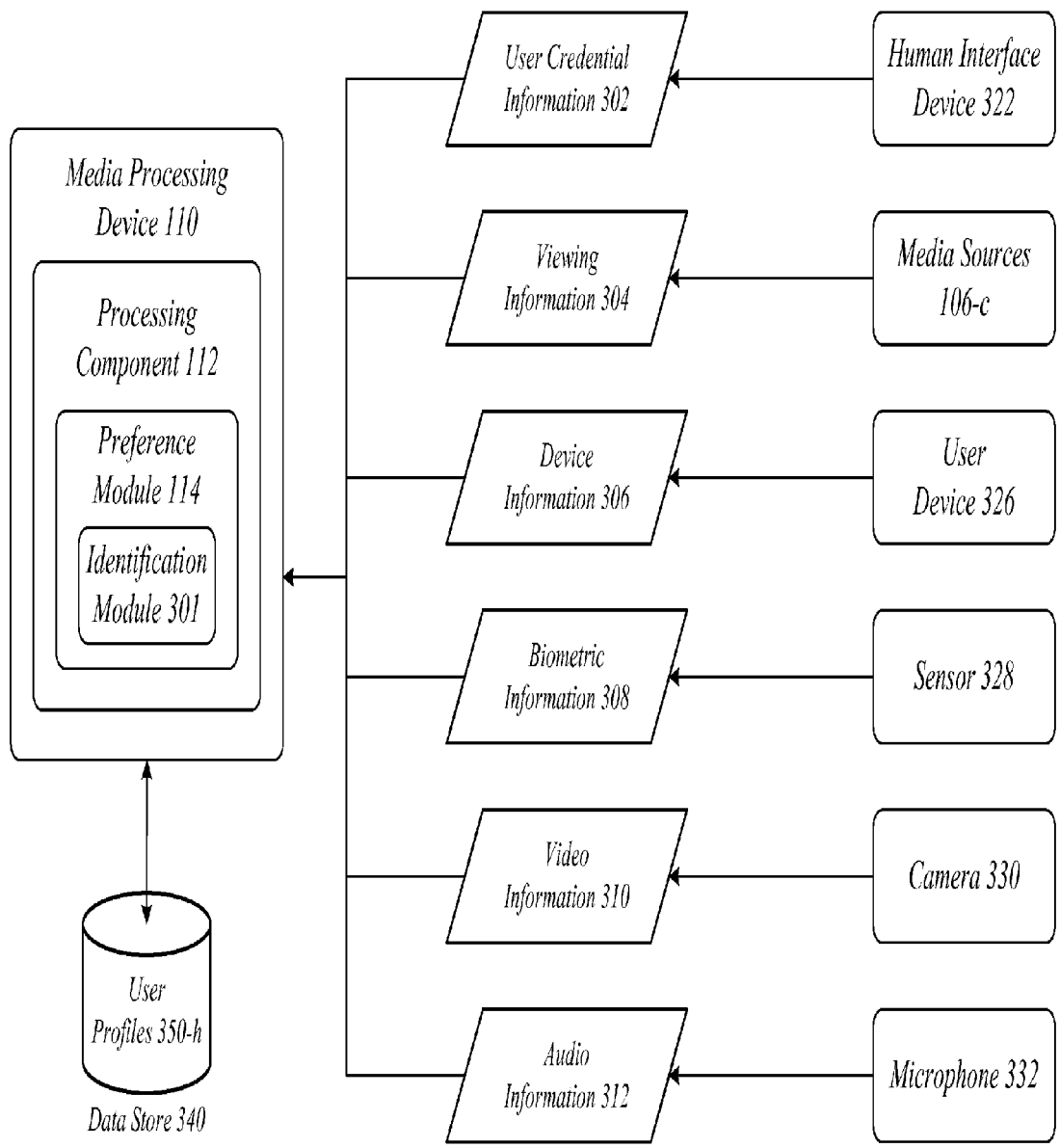
FIG. 3 illustrates one embodiment of a first operating environment.

FIG. 3 illustrates an operating environment 300 for the media processing device 110. The operating environment 300, for example, may illustrate structure and/or operations for a preference module 114 and an identification module 301 of the media processing device 110.

In various embodiments, the preference module 114 generally implements techniques to customize media content for the media processing system 100. The preference module 114 may be operative on the processing component 112 to automatically create a user profile 350-h for a user 220-g with individualized viewing preferences by observing viewing patterns and other user behavior.

In one embodiment, the preference module 114 may identify a user 220-1 of a media processing device 110. The preference module 114 may monitor activity of the user 220-1 when using multiple heterogeneous media sources 106-c accessible by the media processing device 110. The preference module 114 may determine implicit viewing preferences of the user 220-1 by analyzing the monitored activity. The preference module 114 may store the implicit viewing preferences as part of a user profile 350-1 associated with the user 220-1 in a data store 340.

In the illustrated embodiment shown in FIG. 3, the preference module 114 may comprise or implement an identification module 301. The identification module 301 may be operative on the processing component 112 to automatically detect a presence of a user 220-1 in a physical room hosting the media processing system 100, and identify the user 220-1 of the media processing device 110 based on information associated with the user 220-1. The identification module 301 may then begin accumulating activity or behavior information about the user 220-1 once the user 220-1 is properly identified. The identification module 301 may utilize several different techniques to ascertain an identity for the user 220-1.

In one embodiment, the identification module 301 may be arranged to automatically identify the user 220-1 of the media processing device 110 through user credential information recognition of the user 220-1 from user credential information 302 associated with the user 301. The user credential information 302 may be captured from data entered by a user through a human interface device 322, such as a keypad, a keyboard, a pointing device, a trackball, a touchpad, a touchscreen, hand gestures, and so forth. The user credential information 302 may comprise any information explicitly provided by a user that uniquely identifies the user. Examples of user credential information 302 may include without limitation a user name, a user identifier, a password, a personal identification number, a security certificate, user metadata, and any other information provided by a user that uniquely identifies the user. The identification module 301 may parse the user credential information 302, compare it to stored user information in the user profile 350-1, and utilize user credential information recognition techniques on the comparison results to derive an identity for the user. The user credential recognition algorithm may utilize some form of rules based analysis, heuristics, fuzzy logic, neural network, expert system, or similar techniques to perform matching operations.

In one embodiment, the identification module 301 may be arranged to automatically identify the user 220-1 of the media processing device 110 through viewing pattern recognition of the user from viewing information 304 associated with the user 220-1. The viewing information 304 may be captured directly from one or more media sources 106-c, or indirectly via the media processing device 110. The viewing information 304 may comprise any information implicitly or explicitly provided by the user 220-1 useful in identifying viewing patterns of the user 220-1. Examples of viewing information 304 may include without limitation a user selection of media sources 106-c, programs provided by media sources 106-c, programming channels provided by media sources 106-c, key selection by input devices 102-a (e.g., a remote control device), viewing dates, a viewing times, viewing locations within a room (e.g., a favorite chair), metadata, and any other information useful in discerning viewing patterns of the user 220-1. The identification module 301 may parse the viewing information 304, compare it to stored viewing patterns in the user profile 350-1, and utilize viewing pattern recognition techniques on the comparison results to determine whether there is a match. In the event of a match, the identification module 301 may retrieve a user identifier associated with the stored viewing patterns. The viewing pattern recognition algorithm may utilize some form of rules based analysis, heuristics, fuzzy logic, neural network, expert system, or similar techniques to perform matching operations.

In one embodiment, the identification module 301 may be arranged to automatically identify the user 220-1 of the media processing device 110 through device recognition of the user 220-1 from device information 306. The device information 306 may originate from a user device 326. The user device 326 may be physically connected to the media processing system 110 via a wired interface and associated wired media. Additionally or alternatively, the user device 326 may logically connected to the media processing system 100 via a wireless interface and associated wireless media. In either case, the device information 306 may be captured by the communications component 120 of the media processing device 110. Device information 306 may comprise any information uniquely identifying a device. Examples of device information 306 may include without limitation a device name, a device identifier, a device component name, a device component identifier, a network address, a media access control (MAC) address, device metadata, and so forth. The identification module 301 may parse the device information 306, compare it to stored device information in the user profile 350-1, and utilize device recognition techniques on the comparison results to determine whether there is a match. In the event of a match, the identification module 301 may retrieve a user identifier associated with the stored device information. The device recognition algorithm may utilize some form of rules based analysis, heuristics, fuzzy logic, neural network, expert system, or similar techniques to perform matching operations.

In one embodiment, the identification module 301 may be arranged to automatically identify the user 220-1 of the media processing device 110 through biometric recognition of the user 220-1 from biometric information 308 captured by one or more biometric sensors 328. The biometric sensors 328 may comprise any sensor configured to detect physical characteristics of a human being. Examples for the biometric sensors 328 may include without limitation thermal sensors, motion sensors, retina scanners, fingerprint capture devices, olfactory sensors, pressure sensors, weight sensors, and so forth. Examples of biometric information 308 may include without limitation fingerprints, retinal images, thermal signatures, smells or odors, height, weight, size, and so forth. The identification module 301 may parse the biometric information 308, compare it to stored biometric information in the user profile 350-1, and utilize biometric recognition techniques on the comparison results to determine whether there is a match. In the event of a match, the identification module 301 may retrieve a user identifier associated with the stored biometric information. The biometric recognition algorithm may utilize some form of rules based analysis, heuristics, fuzzy logic, neural network, expert system, or similar techniques to perform matching operations.

In one embodiment, the identification module 301 may be arranged to automatically identify the user 220-1 of the media processing device 110 through visual recognition of the user 220-1 from video information 310 captured in one or more video frames of one or more cameras 330. Examples of cameras 330 may comprise digital cameras, digital video cameras, camcorders, and so forth. Video information 310 may comprise any digital image or digital video captured by the camera 330, or metadata associated with a digital image or digital video captured by the camera 330. The identification module 301 may analyze one or more video frames from the video information 310 to isolate portions of the video frames capturing the user 220-1 (e.g., a face of the user 220-1, a body profile of the user 220-1, hair color of the user 220-1, eye color of the user 220-1, height of the user 220-1, size of the user 220-1, etc.), compare it to stored video information in the user profile 350-1, and utilize video recognition techniques on the comparison results to determine whether there is a match. In the event of a match, the identification module 301 may retrieve a user identifier associated with the stored video information. The video recognition algorithm may utilize some form of rules based analysis, heuristics, fuzzy logic, neural network, expert system, or similar techniques to perform matching operations.

In one embodiment, the identification module 301 may be arranged to automatically identify the user 220-1 of the media processing device 110 through audio recognition of the user 220-1 from audio information 312 captured by one or more microphones 332. The audio information 312 may comprise any acoustic sounds captured by the microphones 332, or metadata associated with acoustic sounds captured by the microphones 332. The identification module 301 may analyze one or more sounds from the audio information 312 to isolate sounds made by the user 220-1 (e.g., a voice of the user 220-1), compare it to stored audio information in the user profile 350-1, and utilize audio recognition techniques on the comparison results to determine whether there is a match. In the event of a match, the identification module 301 may retrieve a user identifier associated with the stored audio information. The video recognition algorithm may utilize some form of rules based analysis, heuristics, fuzzy logic, neural network, expert system, or similar techniques to perform matching operations.

Figure 4:
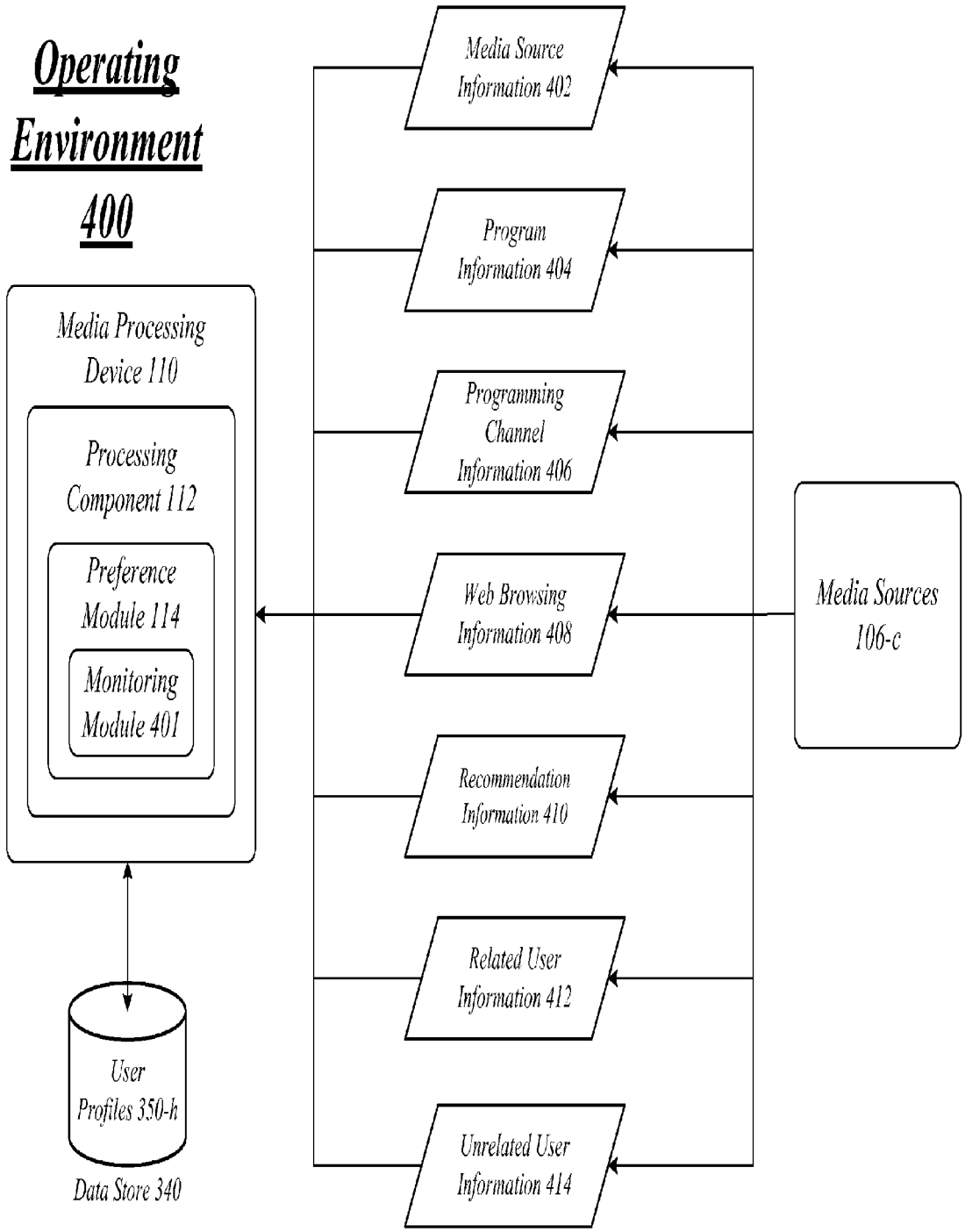
FIG. 4 illustrates one embodiment of a second operating environment.

FIG. 4 illustrates an operating environment 400 for the media processing device 110. The operating environment 400, for example, may illustrate structure and/or operations for a preference module 114 and a monitoring module 401 of the media processing device 110.

In the illustrated embodiment shown in FIG. 4, the preference module 114 may comprise or implement a monitoring module 401. The monitoring module 401 may be generally arranged to monitor online activity of the user 220-1 via the media sources 106-c.

In one embodiment, the monitoring module 401 may be arranged to monitor online activity of the user 220-1 associated with using the multiple heterogeneous media sources 106-c accessible by the media processing device 110, and collect media source information 402 representing one or more media sources 106-c selected by the user 220-1 over a defined time period from the multiple heterogeneous media sources 106-c accessible by the media processing device 110. Media source information 402 may comprise any information relating to media sources 106-c. Examples of media source information 402 may include a media source name, a media source identifier, media source metadata, control information provided by a media source 106-c, a configuration profile for a media source 106-c, attachments for a media source 106-c (e.g., a remote control device integrated with a media source 106-c), and so forth. The monitoring module 401 may store the collected media source information 402 with the user profile 350-1 in the data store 340.

In one embodiment, the monitoring module 401 may be arranged to monitor online activity of the user 220-1 associated with programs provided by the multiple heterogeneous media sources 106-c accessible by the media processing device 110, and to collect program information 404 representing one or more programs selected by the user 220-1 over a defined time period from the multiple heterogeneous media sources 106-c accessible by the media processing device 110. Program information 404 may comprise any information related to a program provided by a media source 106-c. Examples of a program may include a segment of time-delimited media content broadcasted or streamed by a television network or cable network of various genres. Examples of program information 404 may include without limitation a program name, a program identifier, actors in a program, director of a program, producer of a program, provider of a program, owner of a program, writer of a program, genre of a program, time slot of a program, date of a program, media source 106-c providing the program, media content of a program, control information for a program (e.g., scan rate, resolution, etc.), metadata for a program, and so forth. The monitoring module 401 may store the collected program information 404 with the user profile 350-1 in the data store 340.

In one embodiment, the monitoring module 401 may be arranged to monitor online activity of the user associated with programming channels provided by the multiple heterogeneous media sources 106-c accessible by the media processing device 110, and collect programming channel information 406 representing one or more programming channels selected by the user 220-1 over a defined time period from the multiple heterogeneous media sources 106-c accessible by the media processing device 110. Programming channel information 406 may comprise any information related to a programming channel provided by a media source 106-c. Examples of programming channel information 406 may include without limitation a programming channel name, a programming channel identifier, programs provided by a programming channel, genre of a programming channel (e.g., science fiction, action, mystery, comedy, sports, etc.), media source 106-c providing the programming channel, media content of a programming channel, control information for a programming channel, producer for a programming channel, provider for a programming channel, owner of a programming channel, metadata for a programming channel, and so forth. The monitoring module 401 may store the collected programming information 406 with the user profile 350-1 in the data store 340.

In one embodiment, the monitoring module 401 may be arranged to monitor online activity of the user 220-1 associated with web browsing when using the multiple heterogeneous media sources 106-c accessible by the media processing device 110, and collect web browsing information 408 representing web sites or web content selected by the user 220-1 over a defined time period from the multiple heterogeneous media sources 106-c accessible by the media processing device 110. Web browsing information 408 may comprise any information associated with web technologies implemented by a media source 106-c. Examples of web browsing information 408 may include without limitation information about web sites, web page provided by a web site (e.g., extensible markup language (XML) documents), web content provided by a web page, browsing history, a web browser used to access web sites, web applications, web services, web protocols, web servers, web providers, and so forth. The monitoring module 401 may store the collected web browsing information 408 with the user profile 350-1 in the data store 340.

In one embodiment, the monitoring module 401 may be arrange to monitor online activity of the user associated with recommendations made using multiple heterogeneous media sources 106-c accessible by the media processing device 110, and collect recommendation information 410 representing recommendations made by the user 220-1 and published to a web site selected from the multiple heterogeneous media sources 106-c accessible by the media processing device 110. The recommendation information 410 may comprise any information associated with a recommendation provided by the user 220-1 and published to a network service, such as a social networking service (SNS) or web log (blog), for example. Examples of recommendation information 410 may include without limitation a recommendation for a product, a recommendation for a service, a recommendation for a media source 106-c, a recommendation for a program, a recommendation for a programming channel, and so forth. The monitoring module 401 may store the collected recommendation information 410 with the user profile 350-1 in the data store 340.

In one embodiment, the monitoring module 401 may be arranged to monitor online activity of a related user associated with the user 220-1, and collect related user information 412. A related user is anyone having a defined relationship with the user 220-1, such as a friend on a social networking service (SNS), a work peer at an enterprise, a team member for a team, a colleague at a professional organization, and so forth. Examples of related user information 412 may include without limitation information representing media sources 106-c selected by the related user, programs for a media source 106-c selected by the related user, programming channels for a media source 106-c selected by the related user, web sites selected by the related user, recommendations made by the related user and published to a web site (e.g., a SNS), and so forth. The monitoring module 401 may search various media sources 106-c, such as a web site or SNS, to collect the related user information 412, and store the collected related user information 412 with the user profile 350-1 in the data store 340.

In one embodiment, the monitoring module 401 may be arranged to monitor online activity of an unrelated user to the user 220-1 using multiple heterogeneous media sources 106-c accessible by the media processing device 110, and collect unrelated user information 414. An unrelated user is anyone who does not have a defined relationship with the user 220-1, such as an unknown person who provides a recommendation on a blog or commercial website, for example. One example of unrelated user information 414 may include without limitation recommendations made by the unrelated user and published to a web site. The monitoring module 401 may search various media sources 106-c, such as a web site, to collect the unrelated user information 414, and store the collected unrelated user information 414 with the user profile 350-1 in the data store 340.

Figure 5:
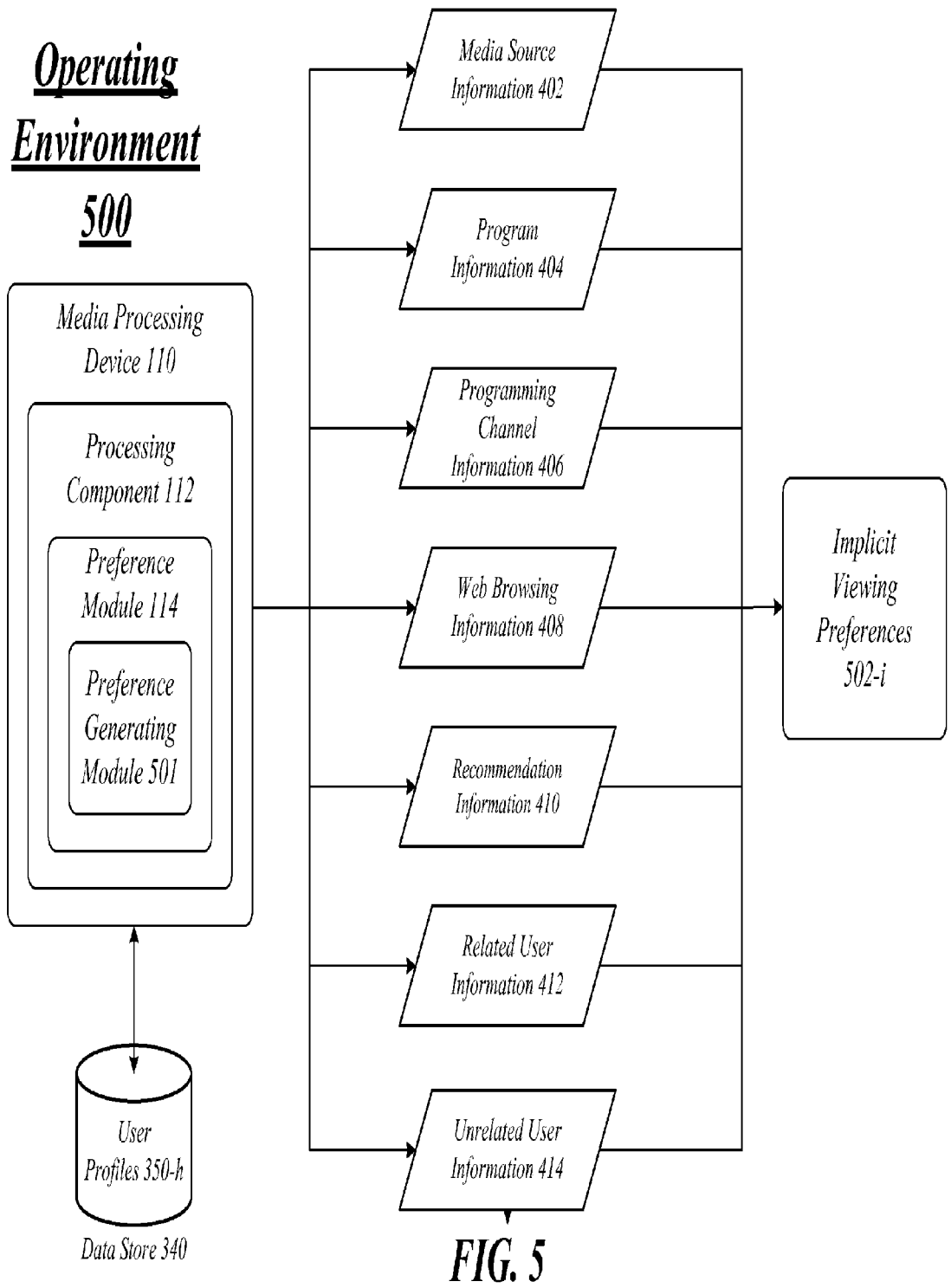
FIG. 5 illustrates one embodiment of a third operating environment.

FIG. 5 illustrates an operating environment 500 for the media processing device 110. The operating environment 500, for example, may illustrate structure and/or operations for a preference module 114 and a preference generating module 501 of the media processing device 110.

In the illustrated embodiment shown in FIG. 5, the preference module 114 may comprise or implement a preference generating module 501. The preference generating module 501 may determine a set of implicit viewing preferences 502-$i$ of the user 220-1 from one or more of media source information 402, program information 404, programming channel information 406, web browsing information 408, recommendation information 410, related user information 412, or unrelated user information 414.

The preference generating module 501 may analyze the various types of information collected by the monitoring module 401, and generate a set of implicit viewing preferences 502-$i$ inferred from the analysis. The preference generating module 501 may implement an implicit viewing preference algorithm utilizing some form of rules based analysis, heuristics, fuzzy logic, neural network, expert system, or similar techniques to perform inference operations. Implicit viewing preferences 502-$i$ may comprise a set of user preferences inferred from the various types of information collected by the monitoring module 401.

By way of example, assume the preference generating module 501 analyzes media source information 402 indicating that the user 220-1 watches programming from a CATV system 90% of the time over a defined time period. The preference generating module 501 may then generate an implicit viewing preference 502-1 from the media source information 402 indicating that the user 220-1 prefers to view programming from a media source 106-1 comprising a CATV system. In another example, assume the preference generating module 501 analyzes the program information 404 indicating that the user 220-1 records every episode of "Amazing Race" from an OTA system. The preference generating module 501 may generate an implicit viewing preference 502-2 from the program information 404 indicating that the user 220-1 prefers to view reality television shows from a media source 106-1 comprising an OTA system. In yet another example, assume the preference generating module 501 analyzes the programming channel information 406 indicating that the user 220-1 tunes into and watches the programming channel "SyFy" every evening from 8-10 pm PST. The preference generating module 501 may generate an implicit viewing preference 502-3 from the programming channel information 406 indicating that the user 220-1 prefers to view programming channels providing science fiction programs from a media source 106-3 comprising a satellite broadcasting system. It may be appreciated that these are merely a few examples of implicit viewing preferences 502-*i*, and the preference generating module 501 can generate any number of implicit viewing preferences 502-*i* depending on the specific type of information collected by the monitoring module 401. The embodiments are not limited in this context.

Figure 6:
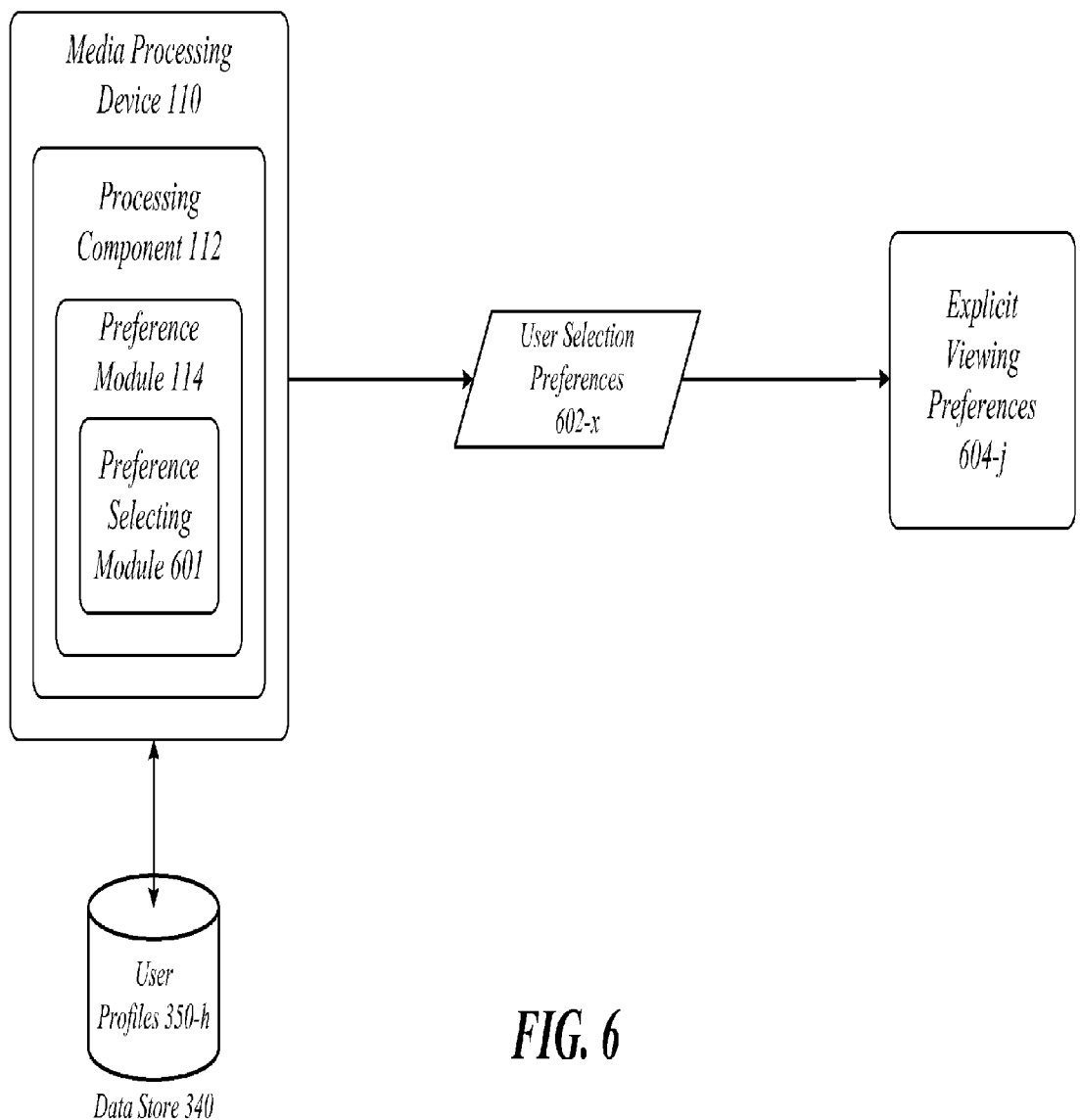
FIG. 6 illustrates one embodiment of a fourth operating environment.

FIG. 6 illustrates an operating environment 600 for the media processing device 110. The operating environment 600, for example, may illustrate structure and/or operations for a preference module 114 and a preference selecting module 601 of the media processing device 110.

In addition to implicit viewing preferences 502-I, the preference module 114 may also generate or determine explicit viewing preferences 604-*j* of the user 220-1. In the illustrated embodiment shown in FIG. 6, the preference module 114 may comprise or implement a preference selecting module 601. The preference selecting module 601 may be arranged to analyze a set of user selection preferences 602-*x*, and determine a set of explicit viewing preferences 604-*j*. Unlike implicit viewing preferences 502-*i*, the explicit viewing preferences 604-*j* represent user preferences explicitly stated by the user 220-1. For instance, the user 220-1 may utilize a GUI tool to enter user preferences into the preference module 114. The user preferences may be stored as user selection preferences 602-*x* in the user profile 350-1 of the data store 340. The preference selecting module 601 may transform the user selection preferences 602-*x* into a set of explicit viewing preferences 604-*j*.

In one embodiment, the preference selecting module 601 may be arranged to determine explicit viewing preferences 604-*j* of the user 220-1 from a set of user selection preferences 602-*x* defined by the user 220-1. By way of example, assume the user 220-1 indicates a preference to watch reality television shows. The preference selecting module 601 stores "reality television shows" as a user selection preference 602-1. The preference selecting module 601 may then search for a comprehensive list of reality television shows, and enumerate each found reality show as an explicit viewing preference 604-*j*. Further assume the user 220-1 indicates a preference to not watch any sports. The preference selecting module 601 stores "sports" as a user selection preference 602-2. The preference selecting module 601 may then search for a comprehensive list of sports and sports programming, including live sporting events, recorded sporting events, shows providing sports pre-game commentary, shows providing sports post-game commentary, and so forth. The preference selecting module 601 may then generate explicit viewing preferences 604-*j* related to the user selection preference 602-2. It may be appreciated that these are merely a few examples of explicit viewing preferences 604-*j*, and the preference generating module 501 can generate any number of explicit viewing preferences 604-*j* depending on the specific type of user selection preferences 602-*x* defined by the user 220-1. The embodiments are not limited in this context.

Once the preference generating module 501 generates a set of explicit viewing preferences 604-*j*, the preference module 114 may the store explicit viewing preferences 604-*j* as part of the user profile 350-1 for the user 220-1.

Figure 7:
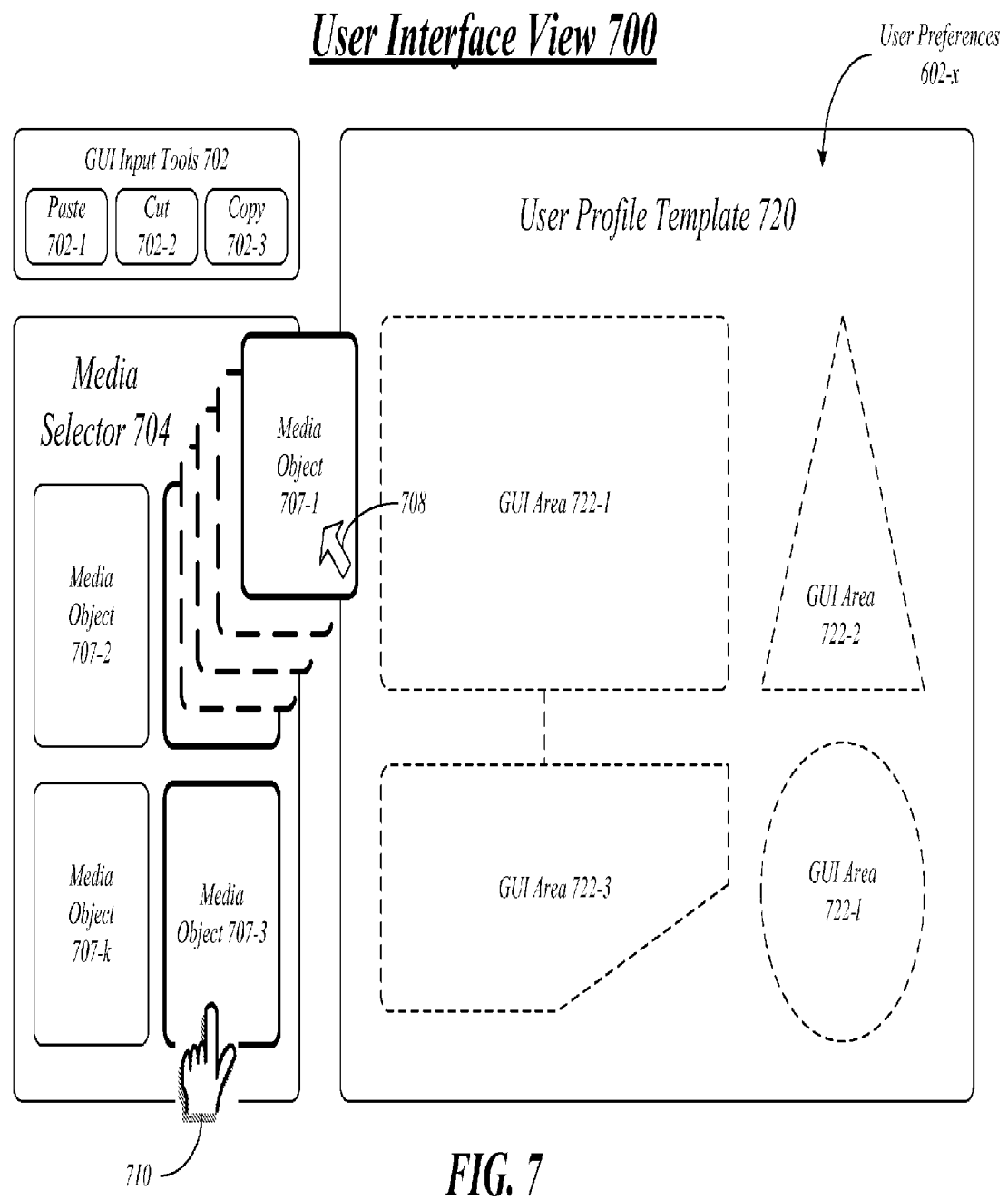
FIG. 7 illustrates one embodiment of a user interface view.

FIG. 7 illustrates a user interface view 700 provided by the preference generating module 501 of the media processing device 110. The user interface view 700, for example, may illustrate a user interface view generated by the preference module 114 and suitable for defining a set of user preferences 602-*x* by the user 220-1 for use by the preference selecting module 601 of the media processing device 110.

In the illustrated embodiment shown in FIG. 7, the user interface view 700 may comprise a set of GUI input tools 702, a media selector 704, and a user profile template 720. The user 220-1 may use the media selector 704 to select one or more media objects 707-*k*, and move the selected media objects 707-*k* to a GUI area 722-*l* of the user profile template 720 to form a set of user selection preferences 602-*x* for the user 220-1. The user 220-1 may select and/or move the selected media objects 707-*k* using a pointing device 708 or a gesture 710. The pointing device 708 may be controlled from a human interface device 322, such as a touch screen or touch pad on a remote control device, for example. A gesture 710 may be captured from a touch screen or touch pad on a remote control device, for example. The gesture 710 may also be captured using a visual gesture interface implemented using the camera 330. Additionally or alternatively, the user 220-1 may use the GUI input tools of paste 702-1, cut 702-2 or copy 702-3 to move the selected media objects 707-*k*.

The media objects 707-*k* may comprise GUI elements, such as thumbnail images, representing various properties or attributes of the media processing system 100. Examples for the media objects 707-*k* may include without limitation GUI elements representing a media source 106-*c*, a program for a media source 106-*c*, a programming channel for a media source 106-*c*, a program genre, an actor, a director, a producer, a writer, a web browser, a web site, a related user, an unrelated user, a date, a time, a time slot, and so forth. In some cases, the selected media objects 707-*k* may be associated with each other, as represented by the dotted line between GUI areas 722-1, 722-3, thereby forming combinations of user selection preferences 602-*x*.

Once the preference module 114 creates and stores the user profile 350-1 having a set of implicit viewing preferences 502-*i* and explicit viewing preferences 604-*j*, the preference module 114 may be arranged to provide custom viewing recommendations to the user 220-1 based on the implicit viewing preferences 502-*i* and the explicit viewing preferences 604-*j*. The custom viewing recommendations may recommend a media source 106-*c*, a program provided by a media source 106-*c*, a programming channel provided by a media source 106-*c*, and so forth. In one embodiment, the custom viewing recommendations may be presented via a custom user interface view 230 for selection by the user 220-1. In one embodiment, the custom viewing recommendations may be implemented by the media processing device 110 to automatically present a program or a programming channel on the output device 104-1.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 illustrates one embodiment of a logic flow 800. The logic flow 800 may be representative of some or all of the operations executed by one or more embodiments described herein, such as the preference module 114 of the media processing device 110, for example.

In the illustrated embodiment shown in FIG. 8, the logic flow 800 may identify a user of a media processing device at block 802. For example, the identification module 301 may identify a user 220-1 of a media processing device 110. The identification module 301 may use various identification techniques. For instance, the identification module 301 may identify the user 220-1 of the media processing device 110 based on user credential information 302, viewing information 304, device information 306, biometric information 308, video information 310, or audio information 312.

The logic flow 800 may monitor online activity of the user when using multiple heterogeneous media sources accessible by the media processing device at block 804. For example, the monitoring module 401 may monitor online activity of the user 220-1 when using multiple heterogeneous media sources 106-c accessible by the media processing device 110, online activity of the user 220-1 associated with programs provided by the multiple heterogeneous media sources 106-c accessible by the media processing device 110, online activity of the user 220-1 associated with programming channels provided by the multiple heterogeneous media sources 106-c accessible by the media processing device 110, online activity of the user 220-1 associated with web browsing when using the multiple heterogeneous media sources 106-c accessible by the media processing device 110, online activity of the user 220-1 associated with recommendations made using multiple heterogeneous media sources 106-c accessible by the media processing device 110, online activity of a related user associated with the user 220-1, or online activity of an unrelated user not associated with the user 220-1 when using multiple heterogeneous media sources 106-c accessible by the media processing device 110.

The logic flow 800 may determine implicit viewing preferences of the user from the monitored activity at block 806. For example, the preference generating module 501 may determine implicit viewing preferences 502-i of the user 220-1 from the monitored activity. More particularly, the preference generating module 501 may determine the implicit viewing preferences 502-i of the user 220-1 from one or more of media source information 402, program information 404, programming channel information 406, web browsing information 408, recommendation information 410, related user information 412, or unrelated user information 414. The implicit viewing preferences 502-i may represent user preferences inferred or deduced from the above-referenced types of information. The preference generating module 501 may utilize some form of rules based analysis, heuristics, fuzzy logic, neural network, expert system, or similar techniques to perform inference operations. Additionally or alternatively, the preference generating module 501 may determine explicit viewing preferences 604-j of the user 220-1 from a set of user selection preferences 602-x explicitly made by the user 220-1.

The logic flow 800 may store the implicit viewing preferences in a user profile for the user at block 808. For example, the preference module 114 may store the implicit viewing preferences 502-i of the user 220-1 in the user profile 350-1 associated with the user 220-1. Additionally or alternatively, the preference generating module 501 may store explicit viewing preferences 604-j of the user 220-1 in the user profile 350-1 associated with the user 220-1.

Once the user profile 350-1 has been created for the user 220-1, the preference module 114 may be arranged to provide custom viewing recommendations to the user 220-1 based on the implicit viewing preferences 502-i and the explicit viewing preferences 604-j via a custom user interface view 230. The custom user interface view 230 may be described in more detail with reference to FIGS. 9A, 9B.

Home Entertainment Portal Welcome Page

The media processing system 100 may be generally arranged to provide a custom user interface view 230 to act as a home entertainment "welcome page" that provides a portal from which pathways lead to content of interest for a user 220-g. The welcome page provides a familiar starting point from which a user 220-g can traverse "hot buttons" to frequently viewed content and on which the user 220-g can receive alerts for upcoming events and incoming communications. The welcome page may be dynamic in nature, providing an animated aesthetic unlike the static pages provided in many conventional entertainment systems. For example, an animated background may indicate the current or forecasted weather pattern.

Because the media processing system 100 is equipped with different types of network access, the welcome page can also merge home entertainment with (increasingly network-based) home automation. For instance, a link on the welcome page can provide access to comprehensive diagnostics and controls for lighting, climate, and security functions.

In addition, the welcome page can also present advertising to the user 220-g on an "opt-in" basis, with the viewer opting-in for specific product lines of interest, in exchange for discounted programming fees, or in exchange for reduced advertising volume elsewhere.

Figure 9A:
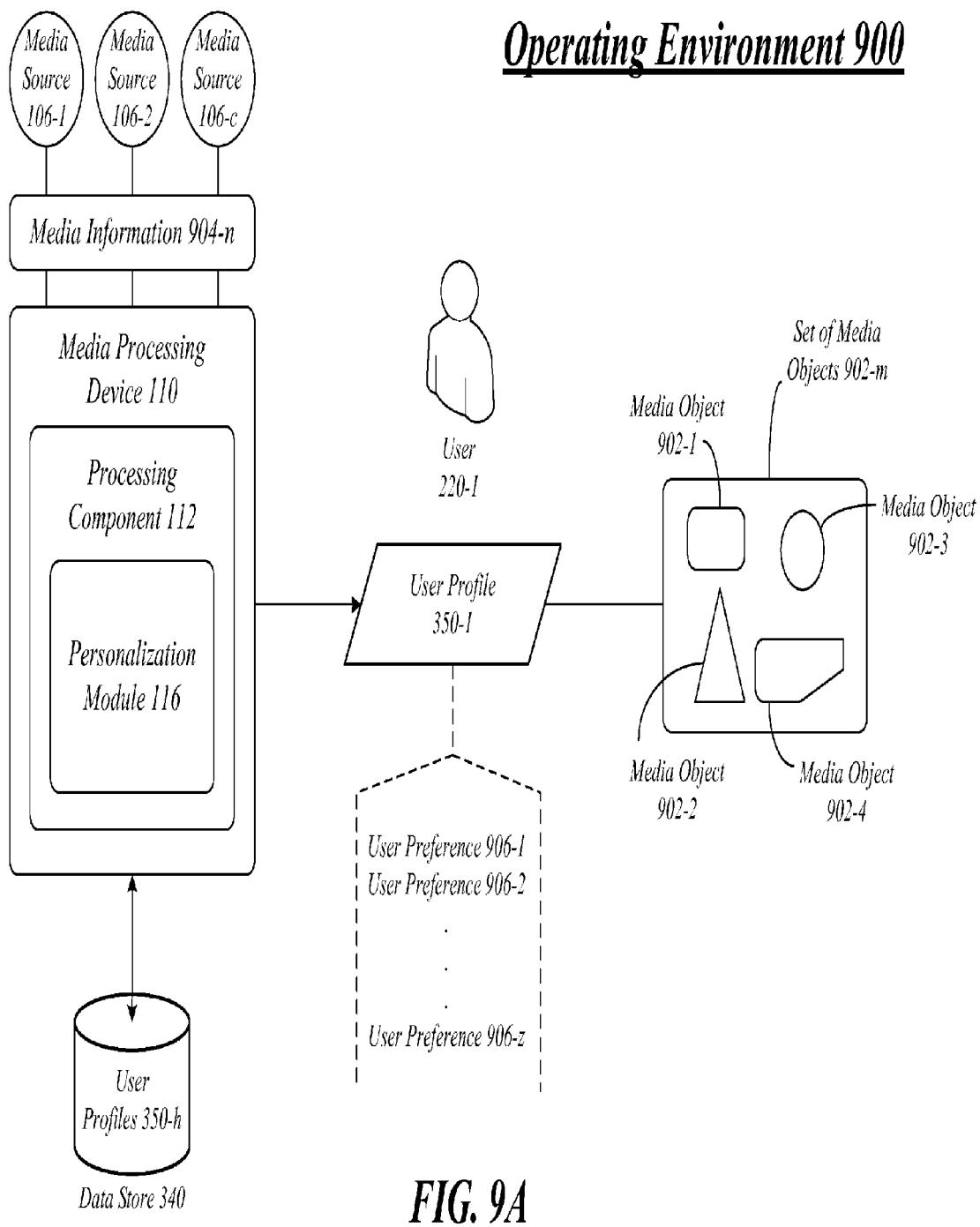
FIG. 9A illustrates one embodiment of a fifth operating environment.
Figure 9B:
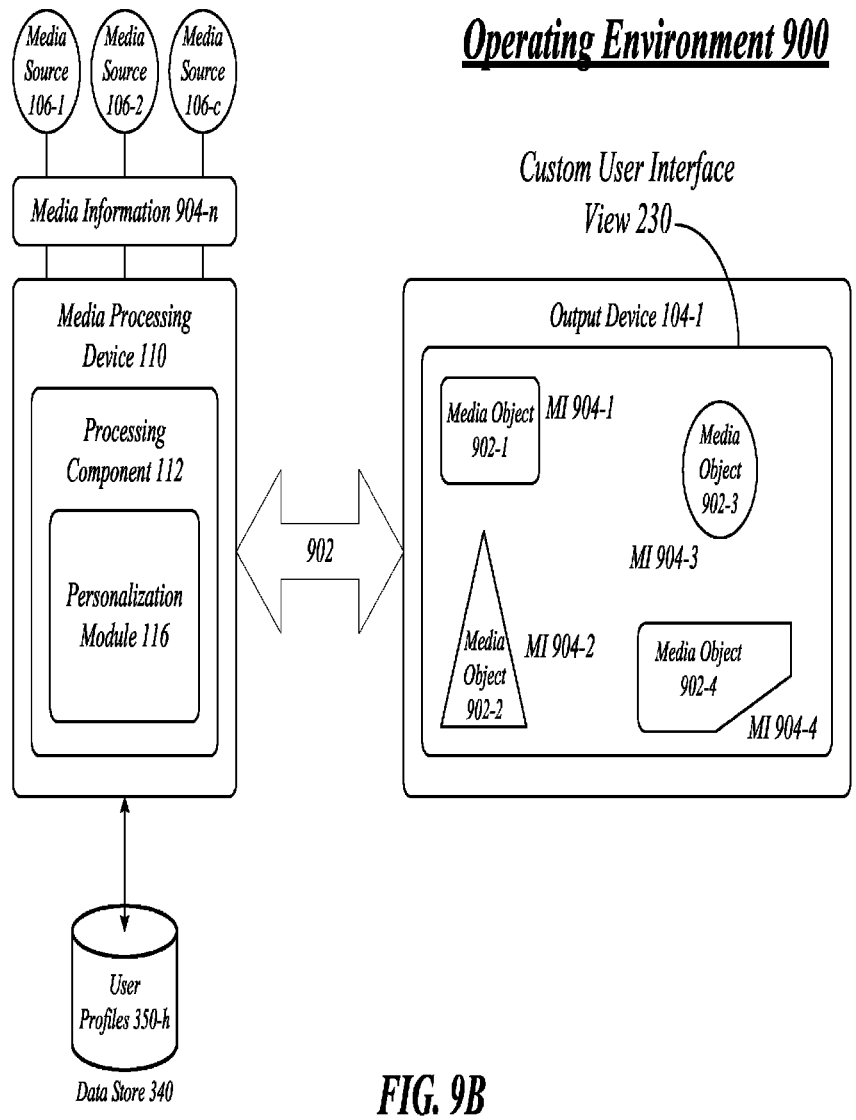
FIG. 9B illustrates one embodiment of a fifth operating environment.

FIGS. 9A, 9B illustrate an operating environment 900 for the media processing device 110. The operating environment 900, for example, may illustrate structure and/or operations for a personalization module 116 of the media processing device 110.

In various embodiments, a personalization module 116 may be operative on the processing component 112 to create a custom user interface view 230 for an individual user 220-1. In one embodiment, for example, the personalization module 116 may be arranged to select a set of media objects 902-m for multiple heterogeneous media sources 106-c accessible by a media processing device 110 based on a set of user preferences 906-z stored in a user profile 350-1, retrieve media information 904-n for one or more of the selected media objects 902-m, and generate a custom user interface view 230 for the user 220-1 with the set of media objects 902-m and associated media information 904-n. In this manner, the custom user interface view 230 becomes an individualized home entertainment portal welcome page that can be presented whenever a single user 220-1 is using the media processing system 100.

As previously described, the identification module 301 of the preference module 116 may be used to automatically identify the user 220-1 of the media processing device 110 using one or more identification techniques. Examples of suitable identification techniques may include user information recognition, viewing pattern recognition, device recognition, biometric recognition, visual recognition, or audio recognition, among others.

Once the user 220-1 is properly identified, the personalization module 116 may retrieve a set of user preferences 906-z stored in the user profile 350-1 associated with the user 220-1. User preferences 906-z may be generally categorized into two major classes of user preferences for content and formatting options suitable for the custom user interface screen 230.

A first class for the user preferences 906-z may include computing user interface configuration options similar to those offered by operating system (OS) software for a computing device. Examples of computing user interface configuration options may include without limitation font type, font size, color schemes, themes, background images, icon type, icon position, menus, screen size, screen resolution, applications, widgets, connected devices, status indicators, shortcuts, and other computing user interface configuration parameters. The embodiments are not limited in this context.

A second class for the user preferences 906-z may include media user interface configuration options similar to those offered by OS software for a media device. Examples of media user interface configuration options may include without limitation media sources 106-c, programs for media sources 106-c, programming channels for media sources 106-c, interfaces such as different electronic program guides (EPG), media icons, media thumbnails, media software widgets, picture-in-picture (PIP) options, and other media user interface configuration parameters. For instance, as previously described, the user profile 350-1 may store various implicit viewing preferences 502-i and explicit viewing preferences 604-j. These are some examples for the user preferences 906-z. Further, the user selection preferences 602-x used to derive explicit viewing preferences 604-j may also comprise examples for user preferences 906-z. The embodiments are not limited in this context.

As the media processing device 110 facilitates navigation and control of various input devices 102-a (e.g., computing devices such as desktop computers, laptop computers, handheld computers, smart phones, home automation systems, home security systems, etc.) and output devices 104-b (e.g., television displays, audio speakers, tactile response devices, etc.), the first class of user preferences 906-z may be used to enhance navigation and control of the input devices 102-a and the output devices 104-b from a single custom user interface view 230. Furthermore, as the media processing device 110 facilitates navigation and control of various media sources 106-c, the second class of user preferences 906-z may be used to enhance navigation and control of the media sources 106-c from a single custom user interface view 230. By utilizing both the first and second classes of user preferences 906-z, a more comprehensive and unified version of a single custom user interface view 230 may be generated to enhance navigation and control of the input devices 102-a, the output devices 104-b, and the media sources 106-c from a single device, that is, the media processing device 110.

In one embodiment, the set of user preferences 906-z may include a user preference 906-1 for a media source 106-c from the multiple heterogeneous media sources 106-c accessible by the media processing device 110. For instance, the user preference 906-1 may indicate that the user 220-1 prefers to receive media content from a CATV system over an OTA system.

In one embodiment, the set of user preferences 906-z may include a user preference 906-2 for a media object 902-m from a media source 106-c from the multiple heterogeneous media sources 106-c accessible by the media processing device 110. For instance, the user preference 906-2 may indicate that the user 220-1 prefers to receive a particular program or type of program from a particular network.

In one embodiment, the set of user preferences 906-z may include a user preference 906-3 for an application associated with a media source 106-c from the multiple heterogeneous media sources 106-c accessible by the media processing device 110. For instance, the user preference 906-3 may indicate that the user 220-1 prefers to use a financial web application or widget to receive real-time financial information for a particular set of investments from a web site.

In one embodiment, the set of user preferences 906-z may include a user preference 906-4 for an electronic device accessible by the media processing device 110. For instance, the user preference 906-4 may indicate that the user 220-1 prefers to control a desktop computing system from the media processing device 110 whenever in front of a television display (e.g., output device 104-1).

In one embodiment, the set of user preferences 906-z may include a user preference 906-5 for a media content interface available for the media processing device 110. For instance, the user preference 906-5 may indicate that the user 220-1 prefers to use an augmented reality user interface comprising a stored or live image of a location with overlays providing user interface controls to the media processing system 100.

In one embodiment, the set of user preferences 906-z may include a user preference 906-6 for an implicit viewing preference 502-i for the user 220-1. For instance, the user preference 906-6 may indicate that the user 220-1 prefers to watch news programs between 10-11 pm PST.

In one embodiment, the set of user preferences 906-z may include a user preference 906-7 for an explicit viewing preference 604-j for the user 220-1. For instance, the user preference 906-7 may indicate that the user 220-1 prefers to watch recorded versions of "Eureka" from the "SyFy" channel when available.

It may be appreciated that the user preferences 906-1 to 906-7 are merely a few examples for user preferences 906-z. The embodiments are not limited to these examples.

Once the user 220-1 is properly identified, the personalization module 116 may programmatically select a set of media objects 902-m based on a set of user preferences 906-z stored in the user profile 350-1 associated with the user 220-1. A media object 902-m may comprise a GUI element used to represent information about a physical device or component of a device, such as an input device 102-a, an output device 104-b, or a media source 106-c. A media object 902-m may also comprise a GUI element used to represent information provided by a physical device or component of a device, such as multimedia information, control information, location information, and so forth. The GUI element may comprise any visual GUI element, such as text, a number, an icon, an image, a thumbnail, a graphic, a symbol, a picture, a button, a menu, a control, a shape, and so forth. The visual GUI element may vary in color, size, shape, geometry, and other visual properties. The GUI element may also comprise auditory GUI elements, such as sounds, bells, whistles, music, speech, and so forth. Any GUI element offered by a given GUI may be used as a media object 902-m, and the embodiments are not limited in this context.

A given media object 902-m may be static or dynamic in nature. In one implementation, a media object 902-m may be static without any moving parts or updated media information 904-n. In another implementation, a media object 902-m may be animated with various moving parts and changing media information 904-n.

In various embodiments, for example, the set of media objects 902-m may include a media object 902-1 for an application, a media object 902-2 for an item from an application, a media object 902-3 for a file for an application, a media object 902-4 for a media content interface, a media object 902-5 for a device connection, a media object 902-6 for a device, a media object 902-7 for a media source 106-c, a media object 902-8 for a program for a media source 106-c, and a media object 902-9 for a programming channel for a media source 106-c, among others. The embodiments are not limited to these examples.

When a given set of media objects 902-m has been selected, as shown in FIG. 9A as media objects 902-1 to 902-4, the personalization module 116 may retrieve media information 904-n for one or more of the selected media objects 902-m. Media information 904-n may comprise any information related to an application or device, or multimedia content provided by an application or device. This could include samples of multimedia content (e.g., a video frame), metadata, and so forth. Examples for the media information 904-n may include without limitation application information, item information, file information, media content interface information, device connection information, device information, media source information, program information, or programming channel information. For instance, media information 904-8 for a media object 902-8 representing a program for a media source 106-c may comprise a thumbnail of a video frame retrieved from a web site provided by an owner of the program. In another example, For instance, media information 904-9 for a media object 902-9 representing a programming channel for a media source 106-c may comprise a network logo retrieved from a video stream received from the media source 106-c. Other examples exist as well.

In one embodiment, the personalization module 116 may retrieve media information 904-n for one or more of the selected media objects 902-m from a web service. A web service is a web technology for communication between multiple electronic devices over a network. More particularly, a web service is a software system designed to support interoperable machine-to-machine interaction over a network. It typically has an interface described in a machine-defined format, such as web services description language (WSDL), for example. Other systems interact with the web service in a manner prescribed by its description using, for example, simple object access protocol (SOAP) messages, typically conveyed using a remote procedure call (RPC) or a hypertext transfer protocol (HTTP) with an extensible markup language (XML) serialization in conjunction with other web services protocol stack. For instance, the personalization module 116 may use web services to access a media source 106-c comprising a web site provided by a web server over an Internet Protocol (IP) network to retrieve application data or metadata for a media object 902-m, such as a software widget or applet, for example.

When a given set of media objects 902-m has been selected, as shown in FIG. 9A as media objects 902-1 to 902-4, the personalization module 116 may retrieve sets of media information 904-1 to 904-4 for the media objects 902-1 to 902-4, respectively, as shown in FIG. 9B. The personalization module 116 may then present the media objects 902-1 to 902-4 and associated media information 904-1 to 904-4 as part of the custom user interface view 230 on the output device 104-1 (e.g., a television screen).

Once a set of media objects 902-m has been identified, and any associated media information 904-n for the media objects 902-m has been retrieved from a media source 106-c, the personalization module 116 may generate a custom user interface view 230 for the user 220-1 with the set of media objects 902-m and associated media information 904-n. The media processing device 116 may then send the custom user interface view 230 to the output device 104-1 to present the custom user interface view 230 for viewing by the user 220-1.

Figure 10:
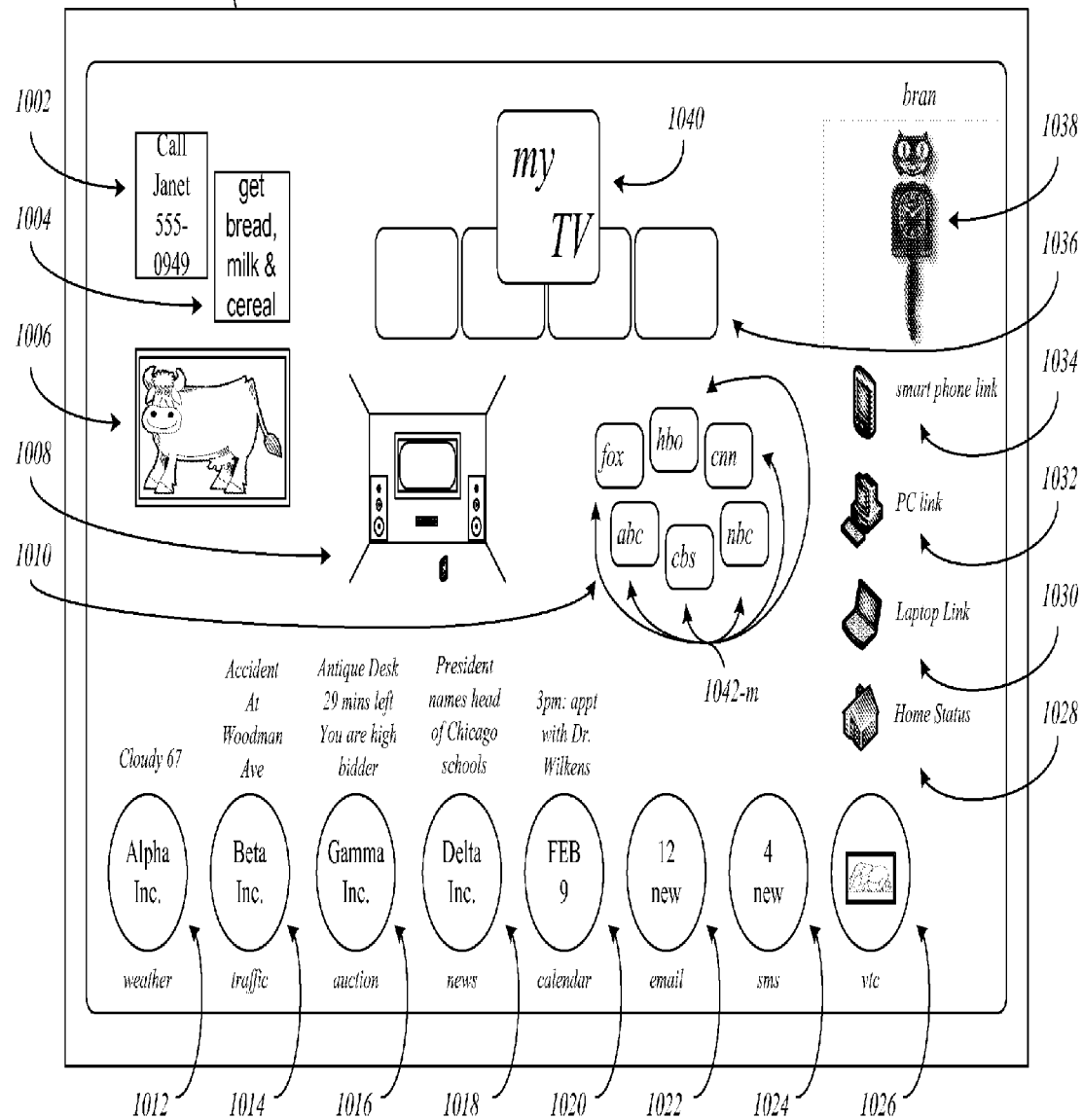
FIG. 10 illustrates one embodiment of a custom user interface view.

FIG. 10 illustrates an exemplary implementation for a custom user interface view 230. In the illustrated embodiment shown in FIG. 10, various implementations for a set of media objects 902-m are presented as various GUI elements with associated text.

The custom user interface view 230 includes a set of GUI elements 1002, 1004 appearing as note items with handwritten text from a note application. The custom user interface view 230 includes a GUI element 1006 appearing as a picture item from a picture application. The custom user interface view 230 includes GUI elements 1008, 1010 appearing as thumbnail versions of different media content interfaces provided by the media processing device 110.

The custom user interface view 230 further includes GUI elements 1012, 1014, 1016, 1018, 1020, 1022, 1024, 1026 appearing as circular shapes with source identifiers and associated media information presented using text and a thumbnail (GUI element 1026). The GUI element 1012 may represent a weather application (or web widget). The GUI element 1014 may represent a traffic application (or web widget). The GUI element 1016 may represent an auction web site. The GUI element 1018 may represent a news web site. The GUI element 1020 may represent a calendar item from a calendar application. The GUI element 1022 may represent a number of email messages currently pending from an email application. The GUI element 1024 may represent a number of short message service (SMS) or instant messaging (IM) messages pending from a SMS or IM application. The GUI element 1026 may represent a video teleconferencing (VTC) application.

The custom user interface view 230 still further includes GUI elements 1028, 1030, 1032, and 1034 appearing as icons with associated text for a set of connected devices and/or systems. The GUI element 1028 represents a link to a home automation system. The GUI element 1030 represents a link to a laptop for the user 220-1. The GUI element 1032 represents a link to a personal computer (PC) for the user 220-1. The GUI element 1034 represents a link to a smart phone for the user 220-1.

The custom user interface view 230 includes a GUI element 1038. The GUI element 1038 comprises a "cat clock" icon that is selectable to scroll between various users 220-g that use the media processing system 100 in order to control which custom user interface view 230 is shown at a given point in time by the output device 104-1. In its current state, the GUI element 1038 provides media information 902-n representing the user 220-1 named "Bran." The illustrated version of the custom user interface view 230 shown in FIG. 10 is customized for the user 220-1. If another user 220-2 named "Mark" is selected, a new custom user interface view 230 may be rendered based on an associated user profile 350-2, and presented on the output device 104-1. In some cases, more than one user 220-g may be selected to use the media processing system 100 at a same time. For instance, an option provided by the GUI element 1038 may be available to select users 220-1, 220-2. In this case, a custom user interface view 230 suitable for both users 220-1, 220-2 may be generated and presented on the output device 104-1, as described in more detail with reference to FIGS. 14-18.

The custom user interface view 230 finally includes a GUI element 1040. The GUI element 1040 comprises a square shape having the text "my TV" embedded in the center of the square. The GUI element 1040 represents a personalized entertainment channel for the user 220-1, as described in more detail below with reference to FIGS. 19-20.

Figure 11:
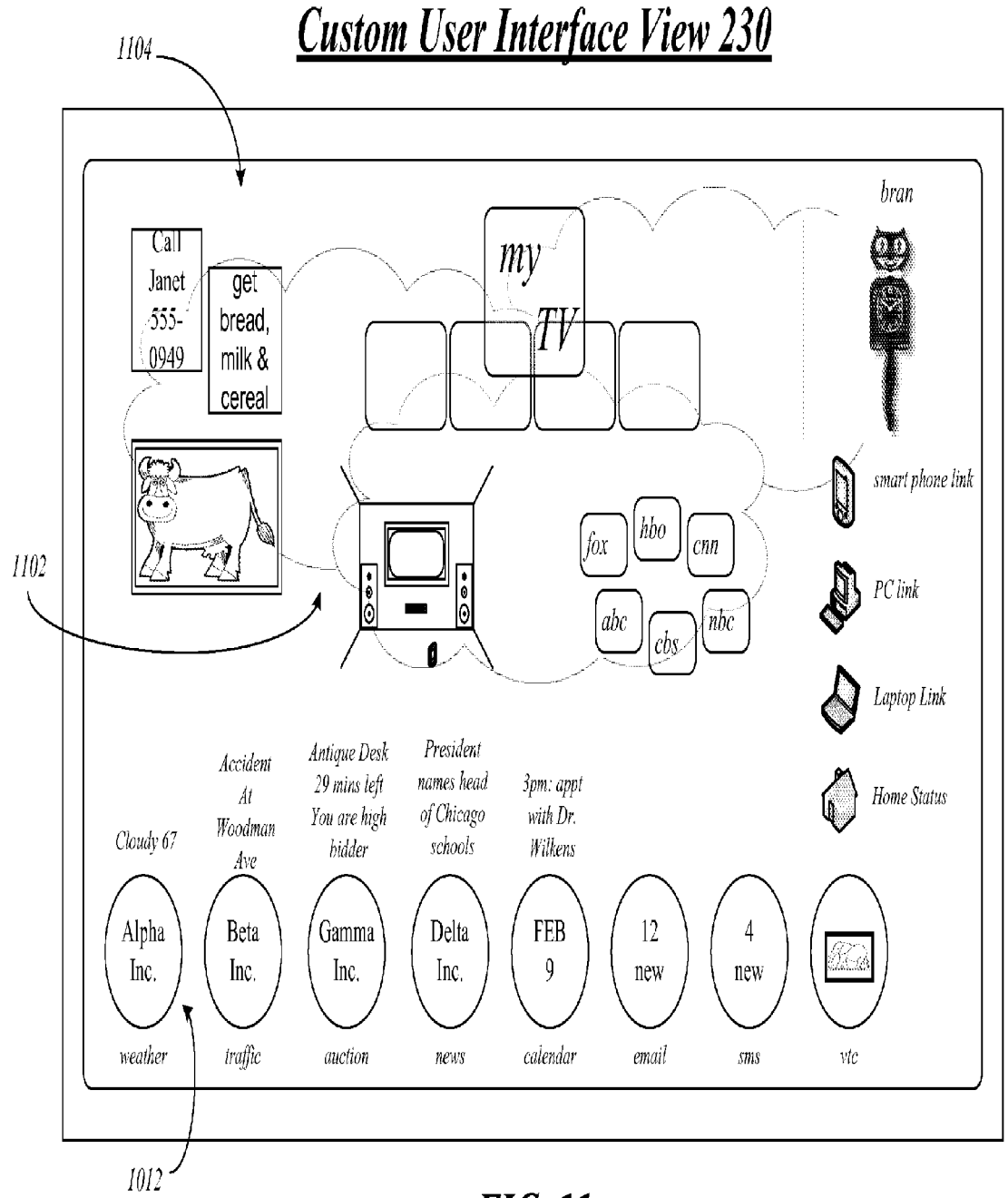
FIG. 11 illustrates one embodiment of a custom user interface view.

FIG. 11 illustrates an exemplary implementation for a custom user interface view 230. In the illustrated embodiment shown in FIG. 11, various implementations for a set of media objects 902-*m* are presented as various GUI elements with associated text as described with reference to FIG. 10. In addition, a GUI element 1102 is added as part of a user interface background 1104 for the custom user interface view 230.

The custom user interface view 230 may be rendered with various layers, including a foreground layer and a background layer. Each layer can implement different media objects 902-*m*. To the extent necessary, overlapping media objects 902-*m* may be given various levels of translucency to reduce or prevent one media object 902-*m* in a foreground layer from occluding another media object 902-*m* in the background layer.

In one embodiment, when generating a custom user interface view 230, the personalization module 116 may be arranged to retrieve media information 904-*n* for one or more selected media objects 902-*m*, select a portion of the retrieved media information 904-*n* for a user interface background 1104 for the selected media objects 902-*m*, and generate a custom user interface view 230 with the user interface background 1104, the set of media objects 902-*m*, and associated media information 904-*n*.

By way of example, assume a user preference 906-1 is for a weather application, and a user preference 906-2 is for a background image of weather predicted for a current date and time. The personalization module 116 may select a media object 902-1 for a weather application. The personalization module 116 may retrieve media information 904-1 representing a current weather forecast for a current date and time for the media object 902-1. A portion of the media information 904-1 may include a static image matching the current weather forecast. In this example, the weather forecast is cloudy, and as such, the GUI element 1102 is a static image of a set of clouds. The personalization module 116 may render a custom user interface view 230 with the media object 902-1 (e.g., the GUI element 1012) in the foreground layer, and a portion of the media information 904-1 (e.g., the static cloud image) for the media object 902-1 (e.g., the GUI element 1102) in the background layer. Various GUI elements overlapping the GUI element 1102 may be rendered with some level of translucency so that the user 220-1 may view the static cloud image in the user interface background 1104 through any overlapping GUI elements.

In addition to static GUI elements, a custom user interface view 230 may include dynamic GUI elements. In one embodiment, for example, the personalization module 116 may retrieve media information 904-*n* for one or more selected media objects 902-*m*, select a portion of the retrieved media information 904-*n* for a user interface background 1104 for the selected media objects 902-*m*, animate the selected portion of the retrieved media information 904-*n* to form an animated user interface background 1104, and generate a custom user interface view 230 with the animated user interface background 1104, the set of media objects 902-*m*, and associated media information 904-*n*.

Continuing with our previous example, assume a user preference 906-1 is for a weather application, and a user preference 906-2 is for a background image of weather predicted for a current date and time. The personalization module 116 may select a media object 902-1 for a weather application. The personalization module 116 may retrieve media information 904-1 representing a current weather forecast for a current date and time for the media object 902-1. A portion of the media information 904-1 may include an animated image matching the current weather forecast. In this example, the weather forecast is cloudy, and as such, the GUI element 1102 is an animated image of a set of clouds (e.g., moving across the background layer 1104). The personalization module 116 may render a custom user interface view 230 with the media object 902-1 (e.g., the GUI element 1012) in the foreground layer, and a portion of the media information 904-1 (e.g., the dynamic cloud image) for the media object 902-1 (e.g., the GUI element 1102) in the background layer. Further assume that the weather forecast changes, and lightning and showers are predicted. The media information 904-1 may be represented by a different GUI element showing an animated image of clouds producing rain and lightning bolts.

Figure 12:
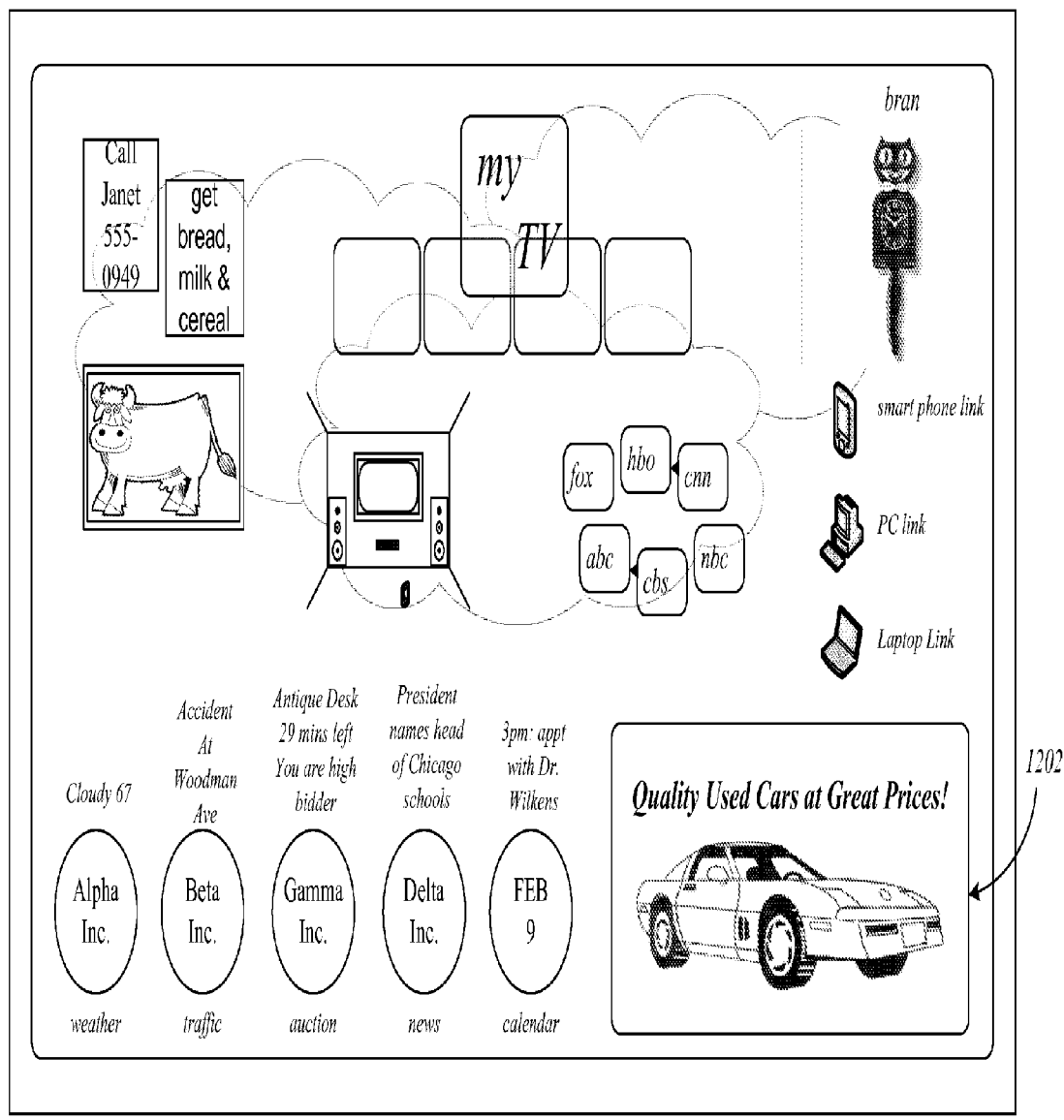
FIG. 12 illustrates one embodiment of a custom user interface view.

FIG. 12 illustrates an exemplary implementation for a custom user interface view 230. In the illustrated embodiment shown in FIG. 12, various implementations for a set of media objects 902-*m* are presented as various GUI elements with associated text.

Consistent with the dynamic nature of a custom user interface view 230, the custom user interface view 230 may be periodically updated with new information, thereby changing a presentation state for the custom user interface view 230. In one embodiment, for example, the personalization module 116 may be arranged to retrieve a specific form of media information 904-*n*, such as advertising information, from a media source 106-*c* (e.g., an advertisement server or web site) of the multiple heterogeneous media sources 106-*c* accessible by the media processing device 110 based on an advertising preference stored in the user profile 350-1. One or more user preferences 906-*z* may indicate user preferences relating to advertisements, such as whether to receive advertising (e.g., opt-in, opt-out), a type of advertising (e.g., computers yes, shoes no), a time to receive advertising (e.g., day yes, night no), and so forth. The embodiments are not limited to these examples.

Assume a user is in the market to buy a new car, and sets a user preference 906-1 to receive advertisements about cars. In some cases, a setting for the user preference 906-1 may be conditional on financial incentives, such as reduced fees for media programming, for example. In the illustrated embodiment shown in FIG. 12, the custom user interface view 230 may be continuously or periodically updated with GUI elements 1202 representing advertising information for cars.

Figure 13:
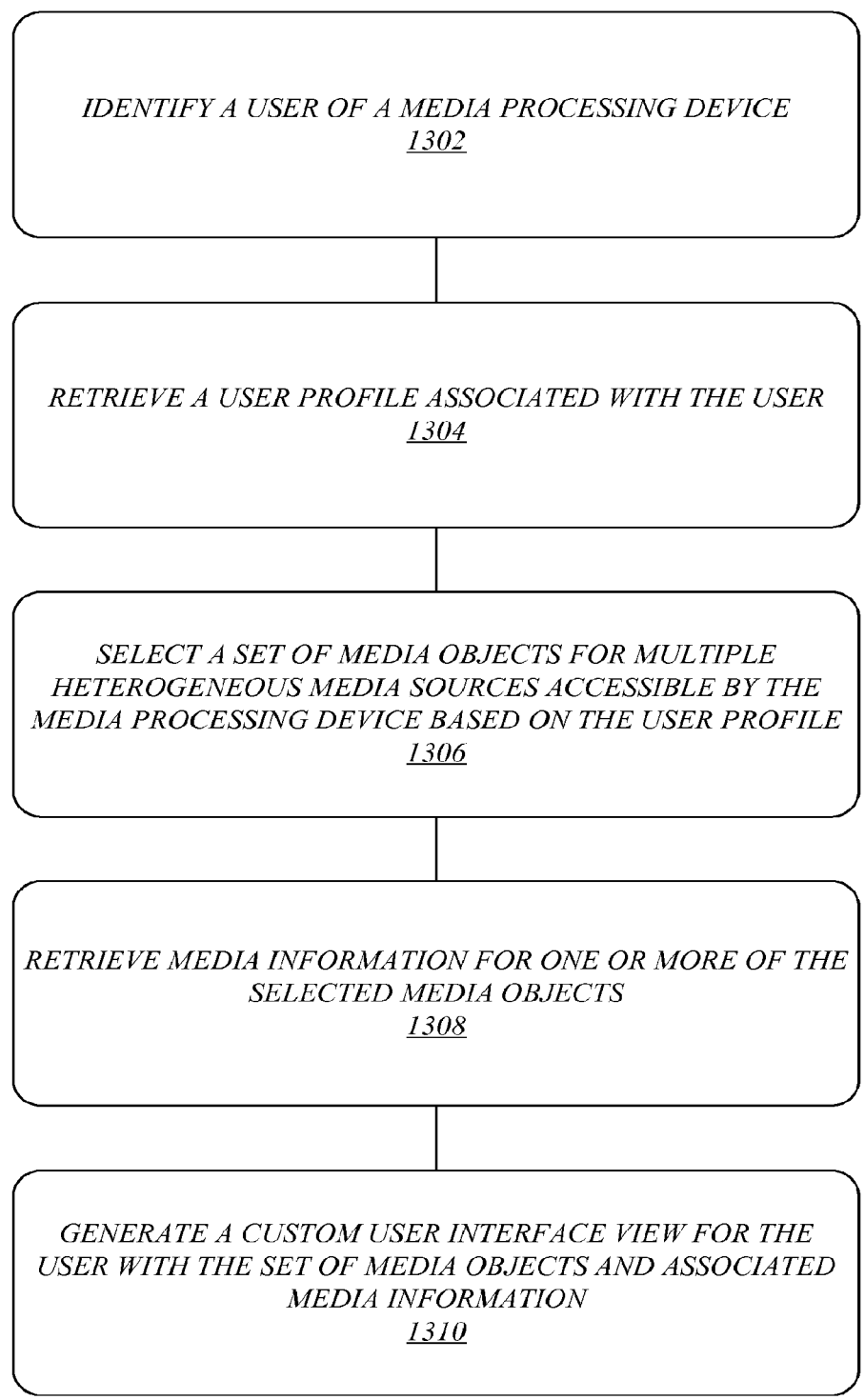
FIG. 13 illustrates one embodiment of a second logic flow.

FIG. 13 illustrates one embodiment of a logic flow 1300. The logic flow 1300 may be representative of some or all of the operations executed by one or more embodiments described herein, such as the personalization module 116 of the media processing device 110, for example.

As shown in the illustrated embodiment shown in FIG. 13, the logic flow 1300 may identify a user of a media processing device at block 1302. For example, the identification module 301 may identify a user 220-1 of a media processing device 110. The identification module 301 may identify the user 220-1 of the media processing device 110 by user information recognition, viewing pattern recognition, device recognition, biometric recognition, visual recognition, audio recognition, or other identity recognition techniques.

The logic flow 1300 may retrieve a user profile associated with the user at block 1304. For example, the personalization module 116 may retrieve a user profile 350-1 associated with the user 220-1. The personalization module 116 may then retrieve a set of user preferences 906-$z$ from the user profile 350-1.

The logic flow 1300 may select a set of media objects for multiple heterogeneous media sources accessible by the media processing device based on the user profile at block 1306. For example, the personalization module 116 may select a set of media objects 902-$m$ for multiple heterogeneous media sources 106-$c$ accessible by the media processing device 110 based on the user profile 350-1. The media objects 902-$m$ may include a media object 902-$m$ for an application, an item from an application, a file for an application, a media content interface, a device connection, a device, a media source, a program for a media source, or a programming channel for a media source.

The logic flow 1300 may retrieve media information for one or more of the selected media objects at block 1308. For example, the personalization module 116 may retrieve media information 904-$n$ for one or more of the selected media objects 902-$m$. The media information 904-$n$ may comprise, for example, application information, item information, file information, media content interface information, device connection information, device information, media source information, program information, or programming channel information.

The logic flow 1300 may generate a custom user interface view for the user with the set of media objects and associated media information at block 1310. For example, the personalization module 116 may generate a custom user interface view 230 for the user 220-1 with the set of media objects 902-$m$ and associated media information 904-$n$. In one embodiment, a static portion of the media information 904-$n$ for a media object 902-$m$ (e.g., a static image) may be presented in a user interface background 1104. Further, a dynamic portion of the media information 904-$n$ for a media object 902-$m$ (e.g., an animated image) may be presented in a user interface background 1104. In one embodiment, the media information 904-$n$ may comprise advertising information retrieved based on an advertising preference stored in the user profile 350-1.

Combined Viewing Recommendations

Individuals who share a television (such as a husband and wife) often encounter difficulty in selecting programming of mutual interest. To ease this selection process, the media processing system 100 can combine information summarizing the preferences of both users to recommend suitable programming. The recommended programming can be presented to the users through the custom user interface view 230.

In one combination scheme, the media processing system 100 intersects lists of programs that each viewer has explicitly tagged as "of interest" to find programming of interest to both viewers. Alternatively, the media processing system 100 can subtract a list of programs explicitly tagged by one viewer as "not of interest" from the "of interest" list of the other viewer(s). The media processing system 100 can combine these two schemes by performing the subtraction on a pair-wise basis prior to the intersection operation. The subtraction operation (e.g. "Mary hates sports") and intersection operation (e.g. "both Mary and John like science fiction movies") can be supplemented by special modifiers (e.g. "neither will under any circumstances watch a Perry Mason program"). The modifiers are hard rules that overrule the general preferences.

In another variation, two broader sets of preferences are mathematically combined to yield a set of preferences reflecting the combined viewing tastes. For example, the system may multiply, on an element-by-element basis, vectors representing the desirability of programming in each viewer's eyes along each of several dimensions. The resulting vector of combined weightings may be applied (via dot multiplication) to the space of available viewing material to find programs collectively preferred by the multiple viewers.

Figure 14A:
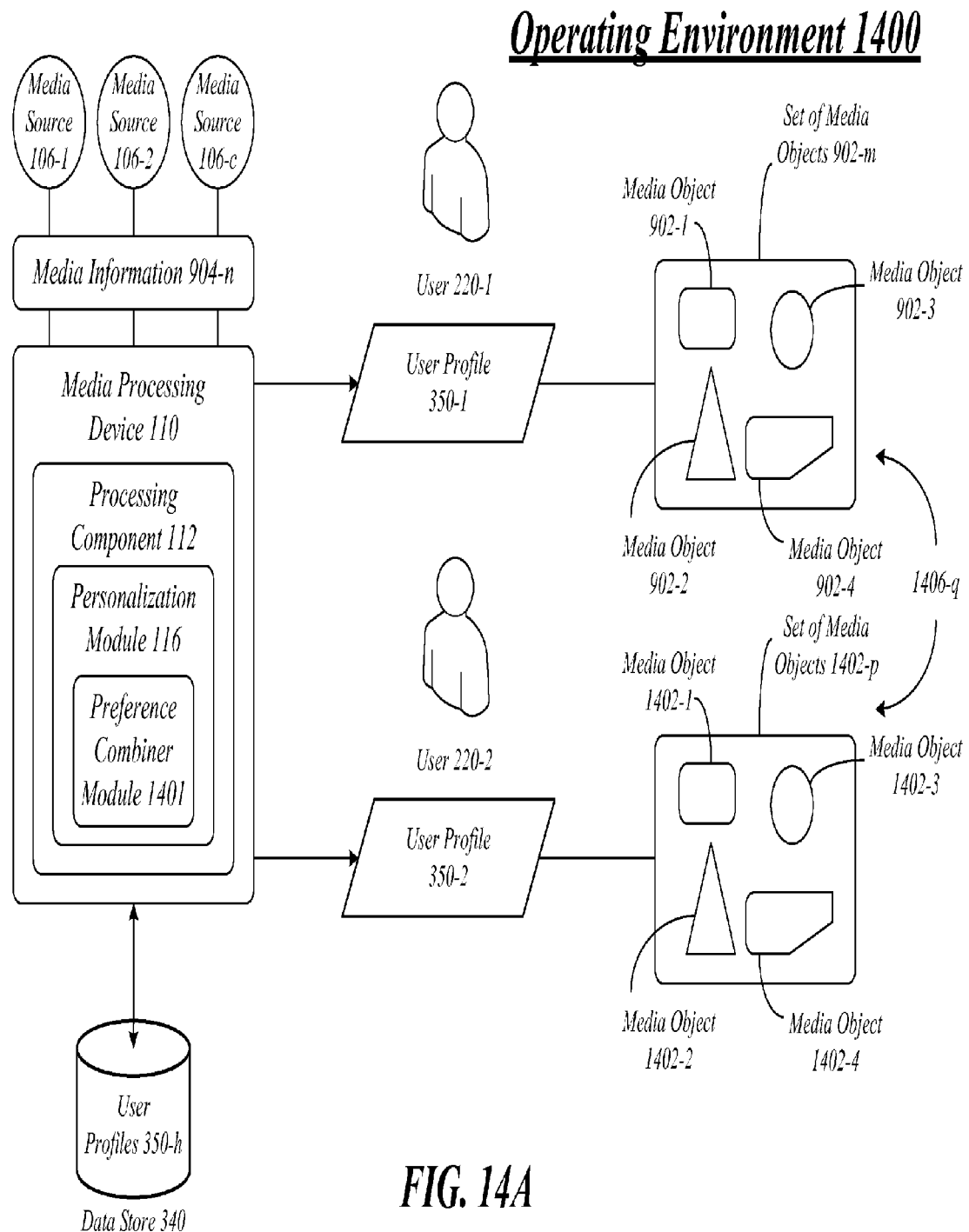
FIG. 14A illustrates one embodiment of a sixth operating environment.
Figure 14B:
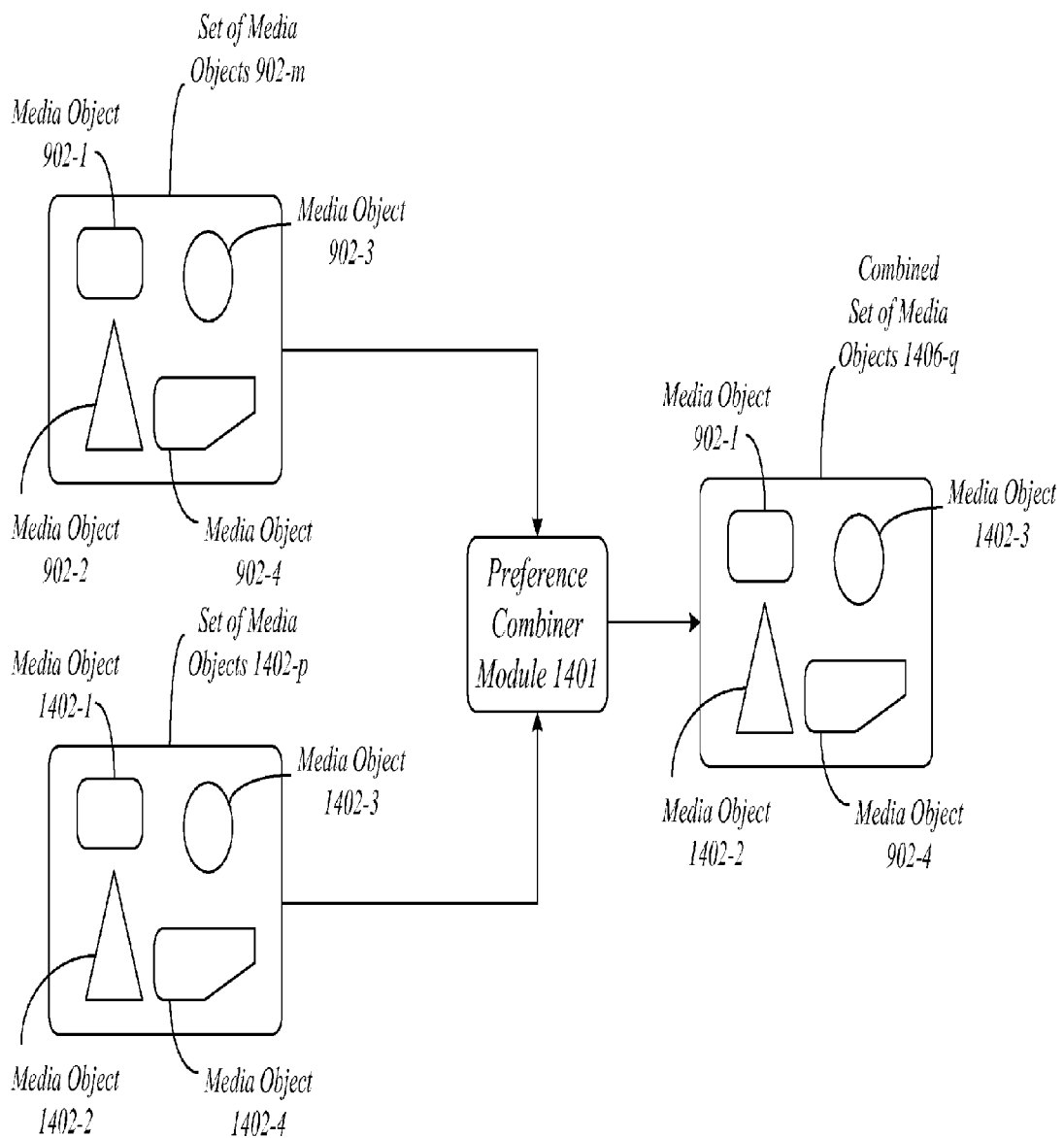
FIG. 14B illustrates one embodiment of a sixth operating environment.
Figure 14C:
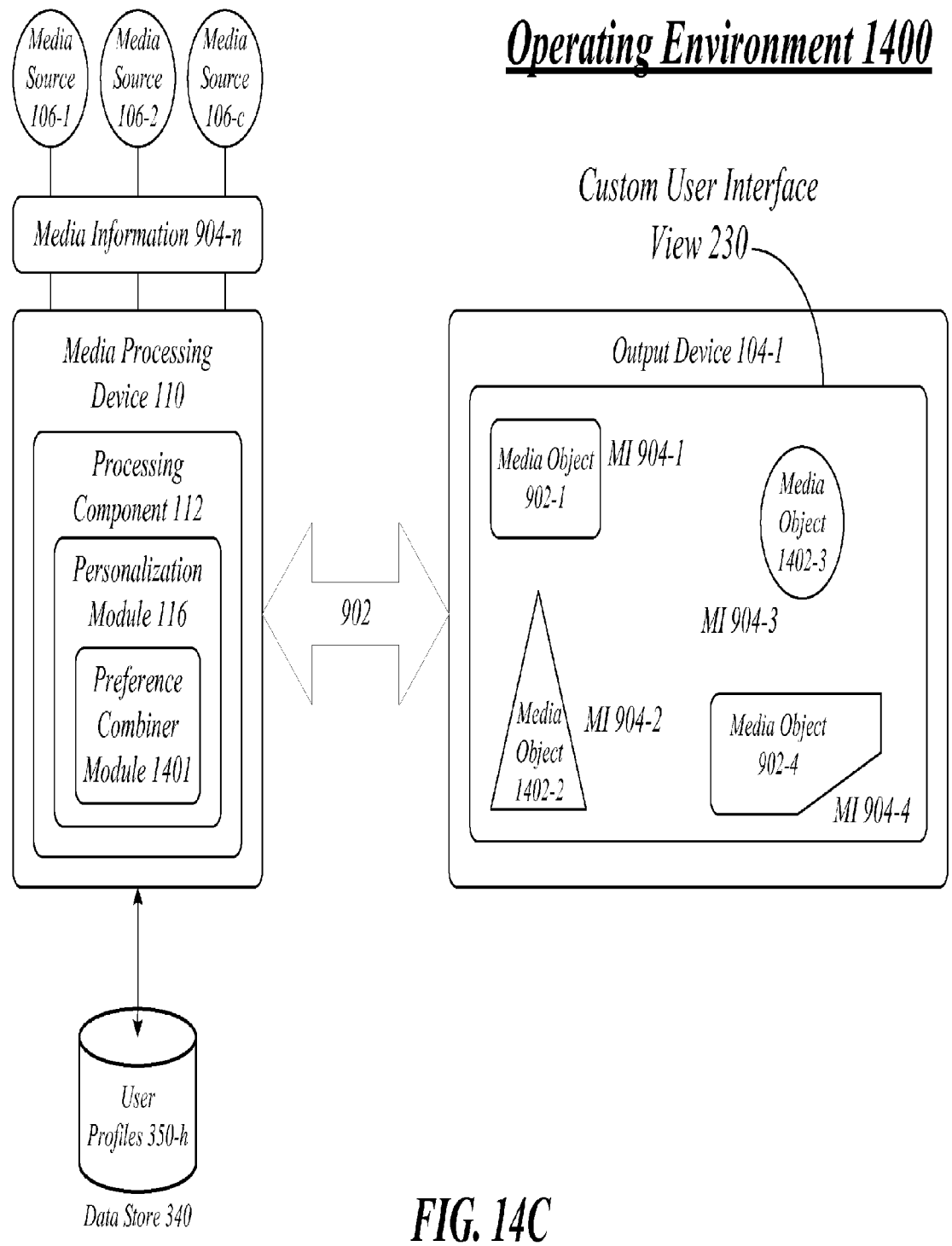
FIG. 14C illustrates one embodiment of a sixth operating environment.

FIGS. 14A-14C illustrate an operating environment 1400 for the media processing device 110. The operating environment 1400, for example, may illustrate structure and/or operations for the personalization module 114 and a preference combiner module 1401 of the media processing device 110.

In various embodiments, a set of techniques may be implemented to create a custom user interface view 230 for multiple users 220-$g$. In the illustrated embodiment shown in FIG. 14A, the personalization module 116 may be arranged to select multiple sets of media objects 902-$m$, 1402-$p$ for multiple heterogeneous media sources 106-$c$ accessible by the media processing device 110 based on multiple user profiles 350-1, 350-2, combine the multiple sets of media objects 902-$m$, 1402-$p$ into a combined set of media objects 1406-$q$, retrieve media information 904-$n$ for media objects 902-$m$, 1402-$p$ from the combined set of media objects 1406-$q$, and generate a custom user interface view 230 with the combined set of media objects 1406-$q$ and associated media information 904-$n$. In this manner, the custom user interface view 230 becomes a combined home entertainment portal welcome page that can be presented whenever multiple users are using the media processing system 100.

As previously described, the identification module 301 of the preference module 116 may be used to automatically identify the users 220-1, 220-2 of the media processing device 110 using one or more identification techniques. Examples of suitable identification techniques may include user information recognition, viewing pattern recognition, device recognition, biometric recognition, visual recognition, or audio recognition, among others.

Once the users 220-1, 220-2 are properly identified, the personalization module 116 may be arranged to select multiple sets of media objects 902-$m$, 1402-$p$ for multiple heterogeneous media sources 106-$c$ accessible by the media processing device 110 based on multiple user profiles 350-1, 350-2. Selection operations may be performed, for example, as described with reference to the FIG. 9.

As shown in FIG. 14B, once the personalization module 116 selects the multiple sets of media objects 902-$m$, 1402-$p$ from the respective user profiles 350-1, 350-2, a preference combiner module 1401 of the personalization module 116 may receive the multiple sets of media objects 902-$m$, 1402-$p$ as inputs, and combine the multiple sets of media objects 902-$m$, 1402-$p$ into a combined set of media objects 1406-$q$, and output the combined set of media objects 1406-$q$. The preference combiner module 1401 may combine the multiple sets of media objects 902-$m$, 1402-$p$ using a number of different mathematical techniques consistent with set theory. Set theory is the branch of mathematics that studies sets, which are collections of objects.

In one embodiment, the preference combiner module 1401 may determine an intersection of the first and second sets of media objects 902-$m$, 1402-$p$ to form the combined set of media objects 1406-$q$. In set theory, the intersection (denoted as $\cap$) of two sets A and B is the set that contains all elements of A that also belong to B (or equivalently, all elements of B that also belong to A), but no other elements. For example, the intersection of the sets $\{1, 2, 3\}$ and $\{2, 3, 4\}$ is $\{2, 3\}$.

The preference combiner module 1401 may use a mathematical intersection operation to find media objects common to both sets of media objects 902-m, 1402-p to form the combined set of media objects 1406-q. For example, assume a first set of media objects 902-m derived from a set of user preferences 906-1, 906-2 for a first user 220-1 includes a media object 902-1 for a preferred media source 106-1 (e.g., a CATV system) and a media object 902-2 for a preferred programming channel, such as "SyFy." Further assume a second set of media objects 1402-p derived from a set of user preferences 906-3, 906-4 for a second user 220-2 includes a media object 1402-1 for a preferred media source 106-1 (e.g., a CATV system) and a media object 1402-2 for a preferred programming channel, such as "ESPN." The preference combiner module 1401 may use a mathematical intersection operation to find media objects common to both sets of media objects {902-1, 902-1} and {1402-1, 1402-2} to form the combined set of media objects {902-1, 1402-1}.

In one embodiment, the preference combiner module 1401 may determine a union of the first and second sets of media objects 902-m, 1402-p to form the combined set of media objects 1406-q. In set theory, the union (denoted as ∪) of two sets A and B is the set that contains all elements of A and B. For example, the union of the sets {1, 2, 3, 4} and {5, 6, 7, 8} is {1, 2, 3, 4, 5, 6, 7, 8}. The preference combiner module 1401 may use a mathematical union operation to find media objects common to both sets of 902-m, 1402-p to form the combined set of media objects 1406-q.

The preference combiner module 1401 may use a mathematical union operation to find all media objects from both sets of media objects 902-m, 1402-p to form the combined set of media objects 1406-q. For example, assume a first set of media objects 902-m derived from a set of user preferences 906-1, 906-2 for a first user 220-1 includes a media object 902-1 for a preferred media source 106-1 (e.g., a CATV system) and a media object 902-2 for a preferred programming channel, such as "SyFy." Further assume a second set of media objects 1402-p derived from a set of user preferences 906-3, 906-4 for a second user 220-2 includes a media object 1402-1 for a preferred media source 106-1 (e.g., a CATV system) and a media object 1402-2 for a preferred programming channel, such as "ESPN." The preference combiner module 1401 may use a mathematical union operation to find all media objects from both sets of media objects {902-1, 902-1} and {1402-1, 1402-2} to form the combined set of media objects {902-1, 902-2, 1402-1, 1402-2}.

Although the preference combiner module 1401 is described as providing combinations using intersection and union operations from set theory, it may be appreciated that other combination operations from set theory may be used as well. For instance, the preference combiner module 1401 may perform combination operations such as set difference, symmetric difference, Cartesian product, power set, complements, relative complements, absolute complements, and so forth. The embodiments are not limited in this context.

In some cases, the preference combiner module 1401 may weight some or all of the media objects from both sets of media objects 902-m, 1402-p prior to performing combination operations to form the combined set of media objects 1406-q. For instance, each of the media objects 902-m, 1402-p may be assigned a weighting factor from an independent rating source and/or from user preferences 906-z to determine sets of vectors. Then vector mathematics (e.g., dot product) may be applied to the set of vectors, and compared to threshold values, to form the combined set of media objects 1406-q.

As shown in FIG. 14C, once a combined set of media objects 1406-q has been identified, and any associated media information 904-n for the combined set of media objects 1406-q has been retrieved from a media source 106-c, the personalization module 116 may generate a custom user interface view 230 for the users 220-1, 220-2 with the combined set of media objects 1406-q and associated media information 904-n. The media processing device 116 may then send the custom user interface view 230 to the output device 104-1 to present the custom user interface view 230 for viewing by the users 220-1, 220-2.

FIG. 15 illustrates one embodiment of a logic flow 1500. The logic flow 1500 may be representative of some or all of the operations executed by one or more embodiments described herein, such as the preference combiner module 1401 and/or the personalization module 116 of the media processing device 110, for example.

As shown in the illustrated embodiment shown in FIG. 15, the logic flow 1500 may identify first and second users of a media processing device at block 1502. For example, the identification module 301 may identify first and second users 220-1, 220-2 of the media processing device 110. The identification module 310 may identify the users 220-1, 220-2 of the media processing device 110 by user information recognition, viewing pattern recognition, device recognition, biometric recognition, visual recognition, audio recognition, or other identity recognition techniques.

The logic flow 1500 may retrieve first and second user profiles associated with the respective first and second users at block 1504. For example, the personalization module 116 may retrieve first and second user profiles 350-1, 350-2 associated with the respective first and second users 220-1, 220-2. The personalization module 116 may then retrieve sets of user preferences 906-z from the user profiles 350-1, 350-2.

The logic flow 1500 may select first and second sets of media objects for multiple heterogeneous media sources accessible by the media processing device based on the respective first and second user profiles at block 1506. For example, the personalization module 116 may select first and second sets of media objects 902-m, 1402-p for multiple heterogeneous media sources 106-c accessible by the media processing device 110 based on the respective first and second user profiles 350-1, 350-2. The media objects 902-m, 1402-p may include a media object for an application, an item from an application, a file for an application, a media content interface, a device connection, a device, a media source, a program for a media source, or a programming channel for a media source.

The logic flow 1500 may combine the first and second sets of media objects into a combined set of media objects at block 1508. For example, the preference combiner module 1401 of the personalization module 116 may combine the first and second sets of media objects 902-m, 1402-p into a combined set of media objects 1406-q. In one embodiment, the preference combiner module 1401 may determine an intersection of the first and second sets of media objects 902-m, 1402-p to form the combined set of media objects 1406-q. In one embodiment, the preference combiner module 1401 may determine a union of the first and second sets of media objects 902-m, 1402-p to form the combined set of media objects 1406-q.

The logic flow 1500 may retrieve media information for one or more media objects from the combined set of media objects at block 1510. For example, the personalization module 116 may retrieve media information 904-n for one or more of the combined set of media objects 1406-q. The media information 904-n may comprise, for example, application information, item information, file information, media content interface information, device connection information, device information, media source information, program information, or programming channel information.

The logic flow 1500 may generate a custom user interface view with the combined set of media objects and associated media information at block 1512. For example, the personalization module 116 may generate a custom user interface view 230 for the users 220-1, 220-2 with the combined set of media objects 1406-q and associated media information 904-n. In one embodiment, a static portion of the media information 904-n for a media object 1406-q (e.g., a static image) may be presented in a user interface background 1104. Further, a dynamic portion of the media information 904-n for a media object 1406-q (e.g., an animated image) may be presented in a user interface background 1104. In one embodiment, the media information 904-n may comprise advertising information retrieved based on an advertising preference stored in the user profiles 350-1, 350-2.

Automatically Directed Personal Entertainment Channel

The media processing system 100 may monitor prior programming selections made by a user to select future programming tailored to the user's interests. In one variation of the media processing system 100, a "MyTV" programming feed with television programming and other content of interest to the user may be selectively streamed to an output device 104-1. The programming feed reflects the inferred preferences (e.g. an intense dislike of sports) of the user, but the media processing system 100 may adapt the selection process based on explicit user requests (e.g. "More programming like this." or "I don't want to see this ever again!"). The programming feed may include commercials on an opt-in basis, as described with reference to FIG. 13. An "OurTV" programming feed may be created for two or more individuals using techniques similar to those described in the combined viewing recommendation embodiments.

Additionally or alternatively, the media processing system 100 may be arranged to alert a user 220-g to potential content of interest as it becomes available. For example, the media processing system 100 may inform the user (e.g. via a pop-up dialog box) that a program consistent with the user's interest will soon be broadcast. If the user 220-g accepts the suggestion, the media programming system 100 switches to the suggested program and automatically records the interrupted program. Correspondingly, if the user 220-g rejects the suggestion, the media processing system 100 can automatically record the suggested program for later viewing if desired by the user 220-g.

Figure 16:
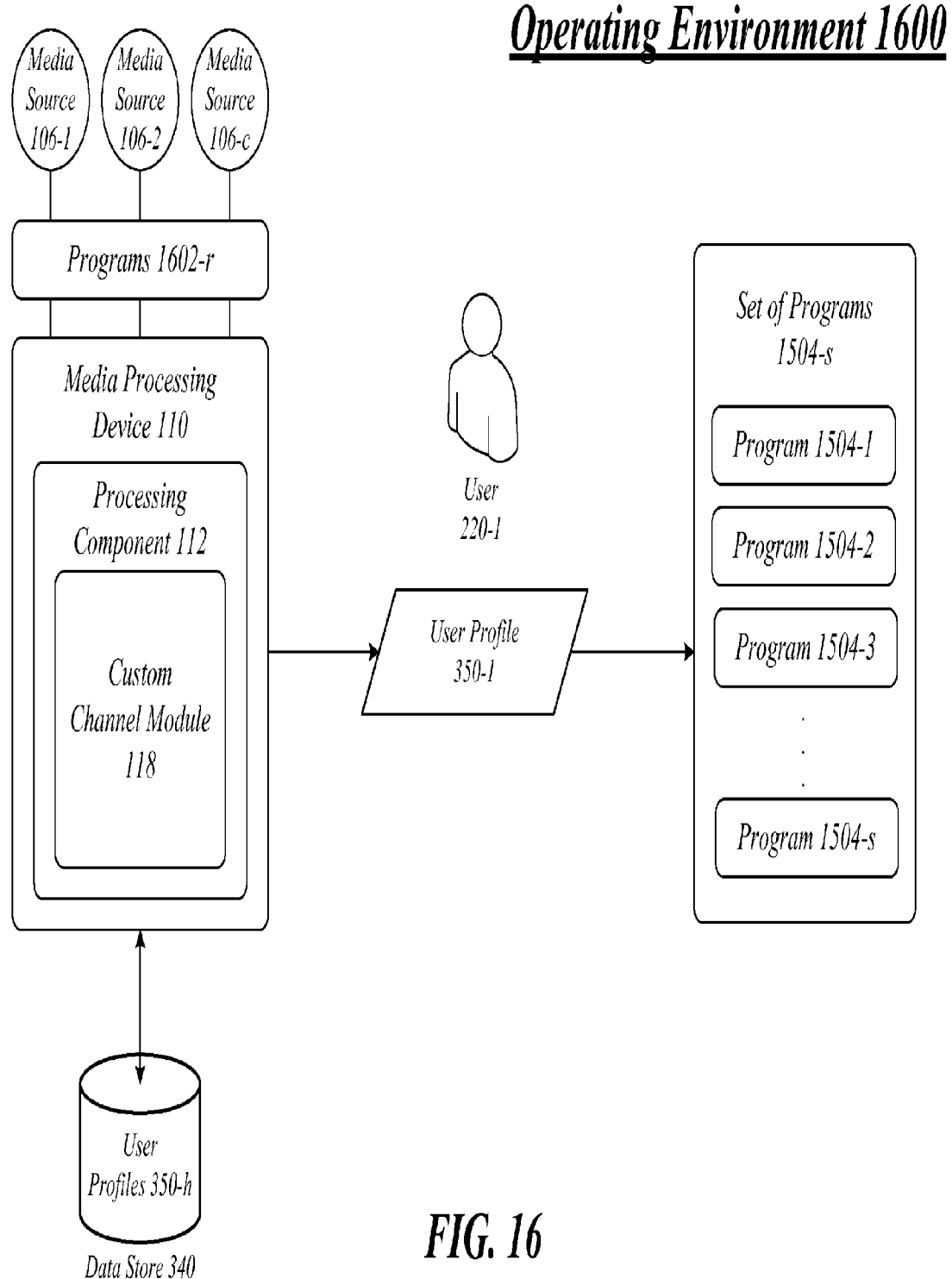
FIG. 16 illustrates one embodiment of a seventh operating environment.

FIG. 16 illustrates an operating environment 1600 for the media processing device 110. The operating environment 1600, for example, may illustrate structure and/or operations for a custom channel module 118 of the media processing device 110.

In various embodiments, a set of techniques may be implemented to create a custom programming channel for one or more users 220-g. The custom programming channel can be accessible via a custom user interface view 230, and selected by one or more users to watch a continuous stream of programs specifically designed according to a set of user preferences 906-z whenever the one or more users 220-g are using the media processing system 100.

In one embodiment, a custom channel module 118 may be operative on the processing component 112 to select a set of programs 1504-s provided by multiple heterogeneous media sources 106-c accessible by the media processing device 110 based on a user profile 350-1 for the user 220-1, organize the set of programs 1504-s into a sequential list of programs 1704-t (shown in FIG. 17) based on a defined order as indicated by a set of order parameters 1702 (shown in FIG. 17) as indicated by a user preference 906-z, and send control directives to one or more media sources 106-c to present the sequential list of programs 1704-t as a stream of programs 1802 (shown in FIG. 18) on an electronic display (e.g., output device 104-1) in accordance with the defined order.

As previously described, the identification module 301 of the preference module 116 may be used to automatically identify the user 220-1 of the media processing device 110 using one or more identification techniques. Examples of suitable identification techniques may include user information recognition, viewing pattern recognition, device recognition, biometric recognition, visual recognition, or audio recognition, among others.

Once the user 220-1 is properly identified, the custom channel module 118 may be arranged to select a set of programs 1504-s provided by multiple heterogeneous media sources 106-c accessible by the media processing device 110 based on a user profile 350-1 for the user 220-1. For example, the custom channel module 118 may retrieve a set of user preferences 906-z stored in the user profile 350-1 associated with the user 220-1. The set of user preferences 906-z may include a user preference 906-1 for a media source 106-c, a user preference 906-2 for a program from a media source 106-c, a user preference 906-3 for a programming channel from a media source 106-c, a user preference 906-4 comprising an implicit viewing preference 502-i for the user 220-1, a user preference 906-5 comprising an explicit viewing preference 604-j for the user, and a user preference 906-6 for advertisements for the user 220-1, and a user preference 906-7 for a defined order, among others.

Figure 17:
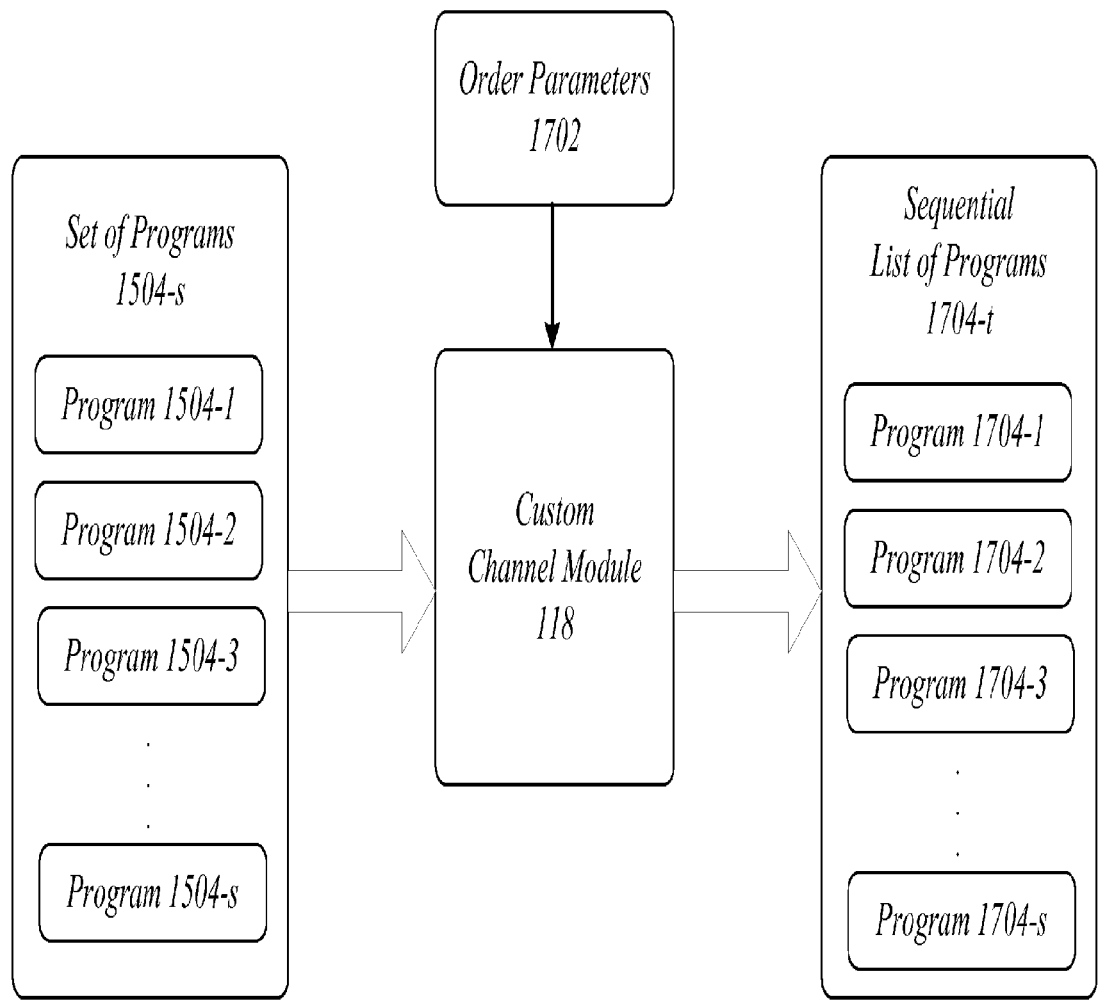
FIG. 17 illustrates one embodiment of an eighth operating environment.

FIG. 17 illustrates an operating environment 1700 for the media processing device 110. The operating environment 1700, for example, may illustrate structure and/or operations for a custom channel module 118 of the media processing device 110.

As shown in FIG. 17, the custom channel module 118 may receive as inputs the set of programs 1504-s and a set of order parameters 1702. The custom channel module 118 may organize the set of programs 1504-s into a sequential list of programs 1704-t based on a defined order as indicated by a set of order parameters 1702 as indicated by a user preference 906-z. For instance, the order parameters 1702 may indicate that programs from a science fiction genre should be shown first, programs from an action genre should be shown second, programs from a reality show genre should be shown third, and so forth.

Figure 18A:
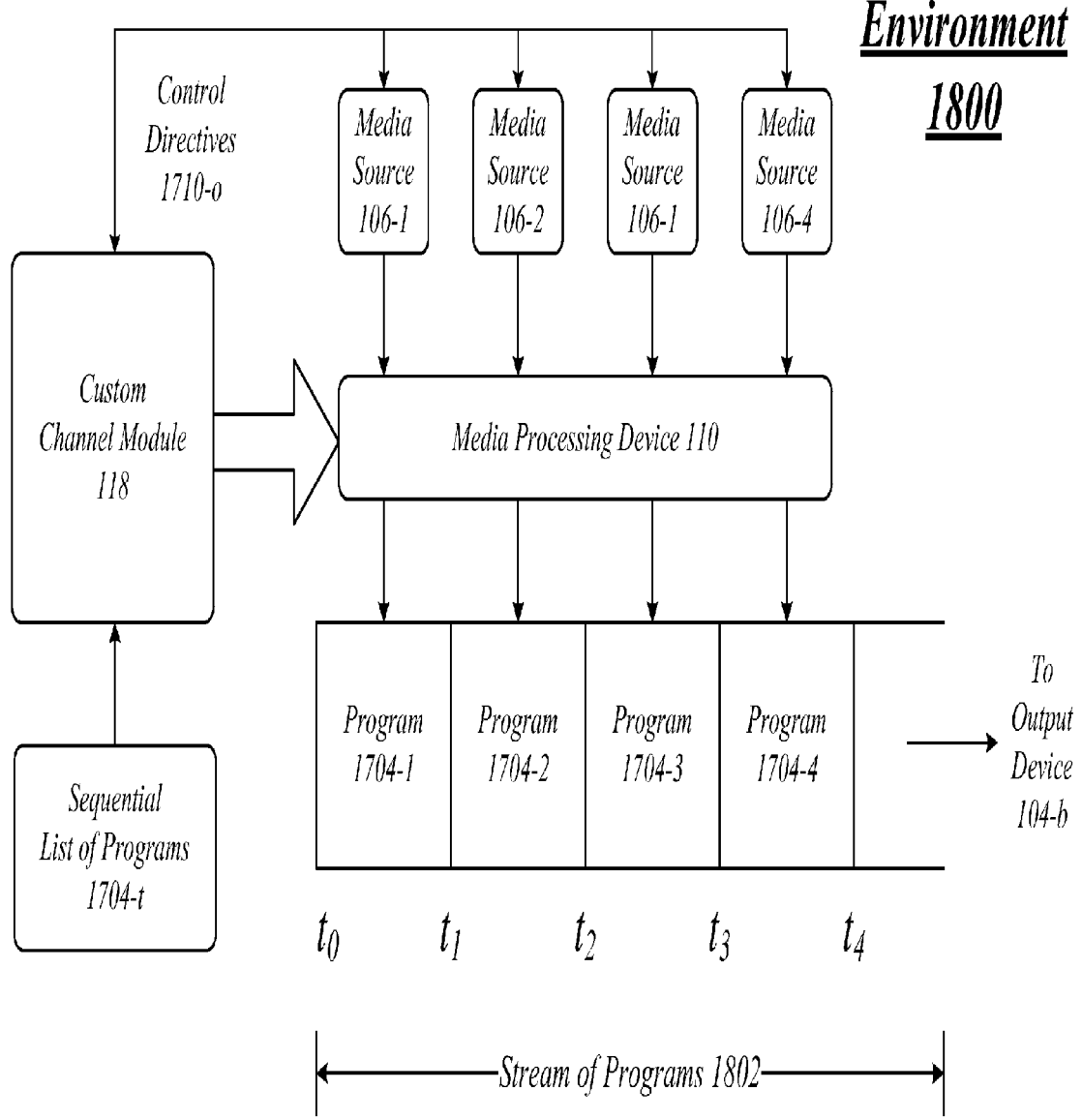
FIG. 18A illustrates one embodiment of a ninth operating environment.
Figure 18B:
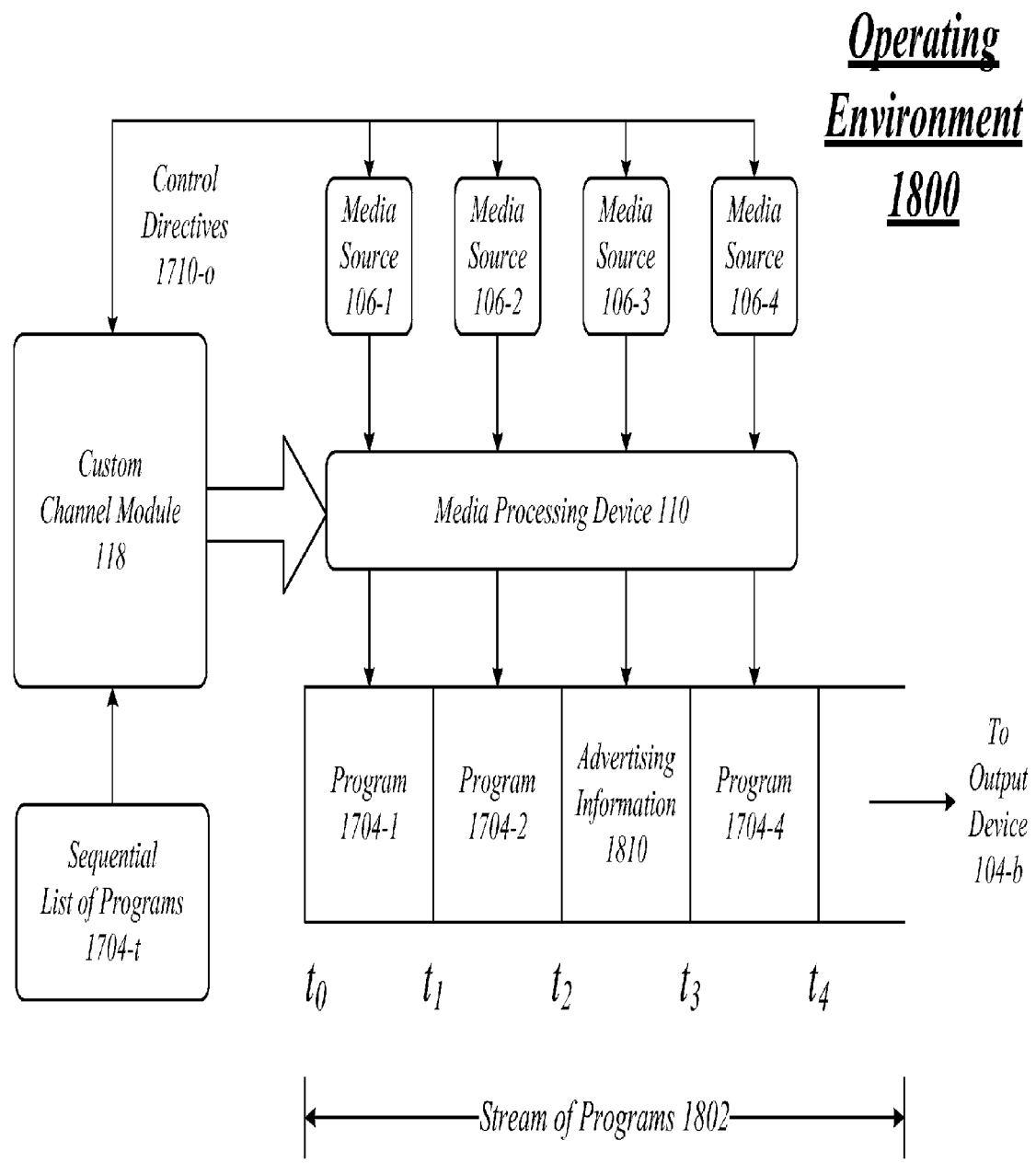
FIG. 18B illustrates one embodiment of a ninth operating environment.

FIGS. 18A, 18B illustrate an operating environment 1800 for the media processing device 110. The operating environment 1800, for example, may illustrate structure and/or operations for a custom channel module 118 of the media processing device 110.

As shown in FIG. 18, the custom channel module 118 may send one or more control directives 1710-o to one or more media sources 106-c to present the sequential list of programs 1704-t as a stream of programs 1802 on an electronic display (e.g., output device 104-1) in accordance with the defined order. The custom channel module 118 may use the sequential list of programs 1704-t to build a presentation schedule for the sequential list of programs 1704-t.

In some embodiments, the sequential list of programs 1704-t may include recorded versions of programs from the sequential list of programs 1704-t received from a media source 106-c, such as a recording device, DVR, or CD device. In one embodiment, for example, the custom channel module 118 may send a first control directive 1710-1 to record a program from the selected set of programs 1504-s either before or after the set of programs 1504-s are organized into the sequential list of programs 1704-t (e.g., based on timing considerations), and send a second control directive 1710-2 to present the recorded program as part of a stream of programs 1802 in accordance with the presentation schedule.

In some embodiments, the sequential list of programs 1704-t may include live versions of programs from the sequential list of programs 1704-t received from a media source 106-c, such as CATV, OTA or media server. In one embodiment, for example, the custom channel module 118 may send a first control directive 1710-1 to select a programming channel for a media source 106-c, and send a second control directive 1710-2 to present a program from the programming channel as part of the stream of programs 1802 in accordance with the presentation schedule.

In some embodiments, the sequential list of programs 1704-t may include a combination of recorded versions and live versions of programs from the sequential list of programs 1704-t received from multiple media sources 106-c. In one embodiment, for example, the custom channel module 118 may send a first control directive 1710-1 to select a programming channel for a media source 106-c, send a second control directive 1710-2 to present a live version of a first program from the programming channel as part of the stream of programs 1802 at a first time, receive notification that the live version of the first program is complete (or near completion), send a third control directive 1710-3 to select a recording device (e.g., a media source 106-c), and send a fourth control directive 1710-4 to present a recorded version of a second program from the recording device as part of the stream of programs 1802 at a second time.

The custom channel module 118 may send one or more control directives 1710-o to one or more media sources 106-c to present the sequential list of programs 1704-t as the stream of programs 1802 on an electronic display (e.g., output device 104-1) in accordance with the presentation schedule. The stream of programs 1802 may include a live version of a first program at a first time and a recorded version of a second program at a second time.

In the illustrated embodiment shown in FIG. 18A, at time $t_0$, the custom channel module 118 may send a control directive 1710-1 to media source 106-1 (e.g., a DVR) to instruct the media source 106-1 to begin streaming a recorded version of a program 1704-1. At time $t_1$, the custom channel module 118 may send a control directive 1710-2 to media source 106-2 (e.g., a CATV system) to instruct the media source 106-2 to begin streaming a live version of a program 1704-2. At time $t_2$, the custom channel module 118 may send a control directive 1710-3 to media source 106-1 (e.g., the DVR) to instruct the media source 106-1 to begin streaming a recorded version of a program 1704-3. At time $t_3$, the custom channel module 118 may send a control directive 1710-4 to media source 106-4 (e.g., a web site) to instruct the media source 106-4 to begin streaming a live version of a program 1704-4. The start and end time for the programs 1704-1, 1704-2, 1704-3, 1704-4 may be synchronized to form a substantially continuous stream of programs 1802 customized for the user 220-1. In this manner, the user 220-1 may view a custom programming channel tailored specifically to the likes and dislikes of the user 220-1.

While the user 220-1 is viewing the stream of programs 1802, a scenario may exist where a new program may be identified as a program of interest to the user 220-1. In this case, the custom channel module 118 may generate an alert (e.g., a dialog box) for a first program during presentation of a second program on the electronic display (e.g., output device 104-1). If the alert is accepted, the custom channel module 118 may receive a first control directive 1710-1 from the user to present the first program on the electronic display, send a second control directive 1710-2 to the appropriate media source 106-c to instruct the media source 106-c to present the first program on the electronic display, and send a third control directive 1710-3 to the media source 106-c providing the second program to record the second program. Correspondingly, if the user 220-g rejects the alert, the custom channel module 118 can send a first control directive 1710-1 to the media source 106-c providing the first program to instruct the media source 106-c to automatically record the first program for later viewing if desired by the user 220-1.

By way of example, assume the user 220-1 is currently viewing a movie "Highlander" streaming from a media source 106-1, and the custom channel module 118 detects a movie "Buckaroo Banzai" is ready to start from a media source 106-2, the custom channel module 118 may generate a dialog box providing this information to the user 220-1. The user 220-1 may prefer to switch viewing from the "Highlander" to "Buckaroo Banzai," and uses an input device 102-1 (e.g., a remote control device) to accept the alert and select "Buckaroo Banzai." The custom channel module 118 may receive a first control directive 1710-1 from the user to present "Buckaroo Banzai" on the output device 104-1 (e.g., a television screen), send a second control directive 1710-2 to the media source 106-2 to instruct the media source 106-2 to present "Buckaroo Banzai" on the output device 104-1, and send a third control directive 1710-3 to the media source 106-1 to record the previously viewed movie "Highlander." If the user 220-1 were to reject the alert, the custom channel module 118 may send a first control directive 1710-1 to the media source 106-2 to record the movie "Buckaroo Banzai" for later viewing.

In various embodiments, the stream of programs 1802 may include an advertisement in accordance with a user preference 906-6 for advertisements for the user. In the illustrated embodiment shown in FIG. 18B, at time $t_0$, the custom channel module 118 may send a control directive 1710-1 to media source 106-1 (e.g., a DVR) to instruct the media source 106-1 to begin streaming a recorded version of a program 1704-1. At time $t_1$, the custom channel module 118 may send a control directive 1710-2 to media source 106-2 (e.g., a CATV system) to instruct the media source 106-2 to begin streaming a live version of a program 1704-2. At time $t_2$, the custom channel module 118 may send a control directive 1710-3 to media source 106-3 (e.g., an advertising server) to instruct the media source 106-3 to begin streaming advertising information 1810. At time $t_3$, the custom channel module 118 may send a control directive 1710-4 to media source 106-4 (e.g., a web site) to instruct the media source 106-4 to begin streaming a live version of a program 1704-4. The start and end time for the programs 1704-1, 1704-2, 1810, 1704-4 may be synchronized to form a substantially continuous stream of programs 1802 customized for the user 220-1. In this manner, the user 220-1 may view a custom programming channel, with advertisements, tailored specifically to the likes and dislikes of the user 220-1.

Figure 19:
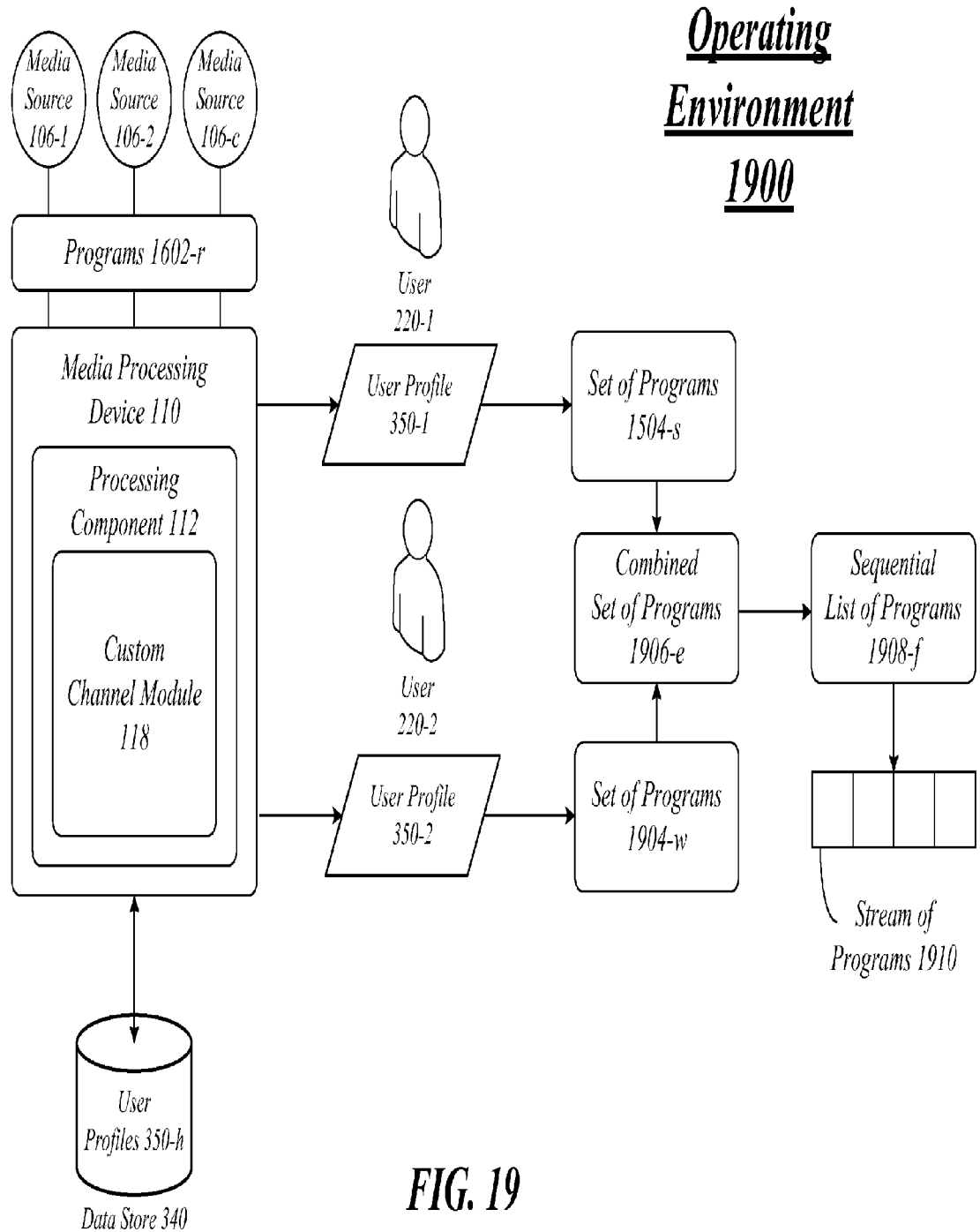
FIG. 19 illustrates one embodiment of a tenth operating environment.

FIG. 19 illustrates an operating environment 1900 for the media processing device 110. The operating environment 1900, for example, may illustrate structure and/or operations for a custom channel module 118 of the media processing device 110.

As with the personalization module 114 creating a custom user interface view 230 for multiple users 220-g, the custom channel module 118 may use similar techniques to create a custom programming channel for multiple users 220-g. In one embodiment, continuing with the previous example, the custom channel module 118 may select a different set of programs 1904-w provided by multiple heterogeneous media sources 106-c accessible by the media processing device 100 based on the user profile 350-2 for another user 220-2, combine the set of programs 1504-s with the different set of programs 1904-w to form a combined set of programs 1906-e, organize the combined set of programs into a sequential list of programs 1908-f based on a defined order, and send control directives 1710-o to one or more media sources 106-c to present the sequential list of programs 1908-f as a stream of programs 1910 on the electronic display (e.g., output device 104-1) in accordance with the defined order.

FIG. 20 illustrates one embodiment of a logic flow 2000. The logic flow 2000 may be representative of some or all of the operations executed by one or more embodiments described herein, such as the custom channel module 118 of the media processing device 110, for example.

As shown in the illustrated embodiment shown in FIG. 20, the logic flow 2000 may identify a user of a media processing device at block 2002. For example, the identification module 301 may identify user 220-1 of the media processing device 110. The identification module 310 may identify the user 220-1 of the media processing device 110 by user information recognition, viewing pattern recognition, device recognition, biometric recognition, visual recognition, audio recognition, or other identity recognition techniques.

The logic flow 2000 may retrieve a user profile associated with the user at block 2004. For example, the custom channel module 118 may retrieve a user profile 350-1 associated with the user 220-1. The custom channel module 118 may then retrieve a set of user preferences 906-z from the user profile 350-1. In one embodiment, the set of user preferences 906-z may include without limitation a user preference 906-1 for a media source 106-c, a user preference 906-2 for a program from a media source 106-c, a user preference 906-3 for a programming channel from a media source 106-c, a user preference 906-4 for an implicit viewing preference 502-i for the user 220-1, a user preference 906-5 for an explicit viewing preference 604-j for the user 220-1, a user preference 906-6 for advertising information 1810 for the user 220-1, or a user preference 906-7 for a defined order, among others.

The logic flow 2000 may select a set of programs provided by multiple heterogeneous media sources accessible by the media processing device based on the user profile at block 2006. For example, the custom channel module 118 may select a set of programs 1504-s provided by multiple heterogeneous media sources 106-c accessible by the media processing device 110 based on the user profile 350-1.

The logic flow 2000 may organize the set of programs into a sequential list of programs based on a defined order at block 2008. For example, the custom channel module 118 may organize the set of programs 1504-s into a sequential list of programs 1704-t based on one or more order parameters 1702. The order parameters 1702 may be derived, for example, from the user preference 906-7 for a defined order for the user 220-1.

The logic flow 2000 may send control directives to one or more media sources to present the sequential list of programs as a stream of programs on an electronic display in accordance with the defined order at block 2010. For example, the custom channel module 118 may send control directives 1710-o to one or more media sources 106-c to present a sequential list of programs 1704-t as a stream of programs 1802 on an electronic display (e.g., output device 104-1) in accordance with the defined order (e.g., order parameters 1702).

Figure 21:
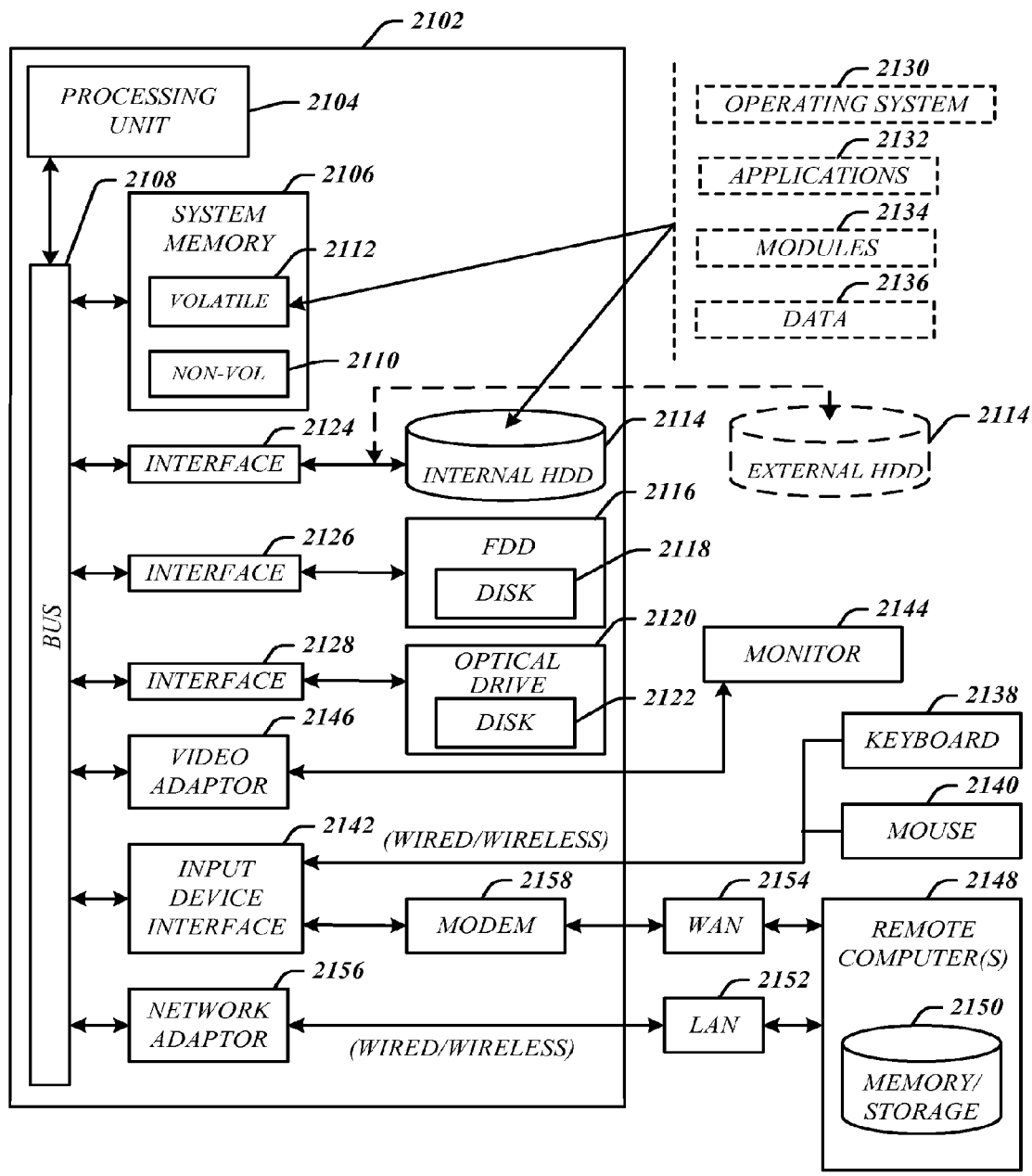
FIG. 21 illustrates one embodiment of a computing architecture.

FIG. 21 illustrates an embodiment of an exemplary computing architecture 2100 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 2100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 2100 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 2100 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 2100.

As shown in FIG. 21, the computing architecture 2100 comprises a processing unit 2104, a system memory 2106 and a system bus 2108. The processing unit 2104 can be any of various commercially available processors. Dual microprocessors and other multi-processor architectures may also be employed as the processing unit 2104. The system bus 2108 provides an interface for system components including, but not limited to, the system memory 2106 to the processing unit 2104. The system bus 2108 can be any of several types of bus structure that may further interconnect to a memory bus (with or without a memory controller), a peripheral bus, and a local bus using any of a variety of commercially available bus architectures.

The computing architecture 2100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 2106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 21, the system memory 2106 can include non-volatile memory 2110 and/or volatile memory 2112. A basic input/output system (BIOS) can be stored in the non-volatile memory 2110.

The computer 2102 may include various types of computer-readable storage media in the form of one or more lower speed memory units, including an internal hard disk drive (HDD) 2114, a magnetic floppy disk drive (FDD) 2116 to read from or write to a removable magnetic disk 2118, and an optical disk drive 2120 to read from or write to a removable optical disk 2122 (e.g., a CD-ROM or DVD). The HDD 2114, FDD 2116 and optical disk drive 2120 can be connected to the system bus 2108 by a HDD interface 2124, an FDD interface 2126 and an optical drive interface 2128, respectively. The HDD interface 2124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2110, 2112, including an operating system 2130, one or more application programs 2132, other program modules 2134, and program data 2136.

The one or more application programs 2132, other program modules 2134, and program data 2136 can include, for example, the preference module 114, the personalization module 116, and the custom channel module 118.

A user can enter commands and information into the computer 2102 through one or more wire/wireless input devices, for example, a keyboard 2138 and a pointing device, such as a mouse 2140. Other input devices may include a microphone, an infra-red (IR) remote control, a joystick, a game pad, a stylus pen, touch screen, or the like. These and other input devices are often connected to the processing unit 2104 through an input device interface 2142 that is coupled to the system bus 2108, but can be connected by other interfaces such as a parallel port, IEEE 1394 serial port, a game port, a USB port, an IR interface, and so forth.

A monitor 2144 or other type of display device is also connected to the system bus 2108 via an interface, such as a video adaptor 2146. In addition to the monitor 2144, a computer typically includes other peripheral output devices, such as speakers, printers, and so forth.

The computer 2102 may operate in a networked environment using logical connections via wire and/or wireless communications to one or more remote computers, such as a remote computer 2148. The remote computer 2148 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2150 is illustrated. The logical connections depicted include wire/wireless connectivity to a local area network (LAN) 2152 and/or larger networks, for example, a wide area network (WAN) 2154. Such LAN and WAN networking environments are commonplace in offices and companies, and facilitate enterprise-wide computer networks, such as intranets, all of which may connect to a global communications network, for example, the Internet.

When used in a LAN networking environment, the computer 2102 is connected to the LAN 2152 through a wire and/or wireless communication network interface or adaptor 2156. The adaptor 2156 can facilitate wire and/or wireless communications to the LAN 2152, which may also include a wireless access point disposed thereon for communicating with the wireless functionality of the adaptor 2156.

When used in a WAN networking environment, the computer 2102 can include a modem 2158, or is connected to a communications server on the WAN 2154, or has other means for establishing communications over the WAN 2154, such as by way of the Internet. The modem 2158, which can be internal or external and a wire and/or wireless device, connects to the system bus 2108 via the input device interface 2142. In a networked environment, program modules depicted relative to the computer 2102, or portions thereof, can be stored in the remote memory/storage device 2150. It will be appreciated that the network connections shown are exemplary and other means of establishing a communications link between the computers can be used.

The computer 2102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 22:
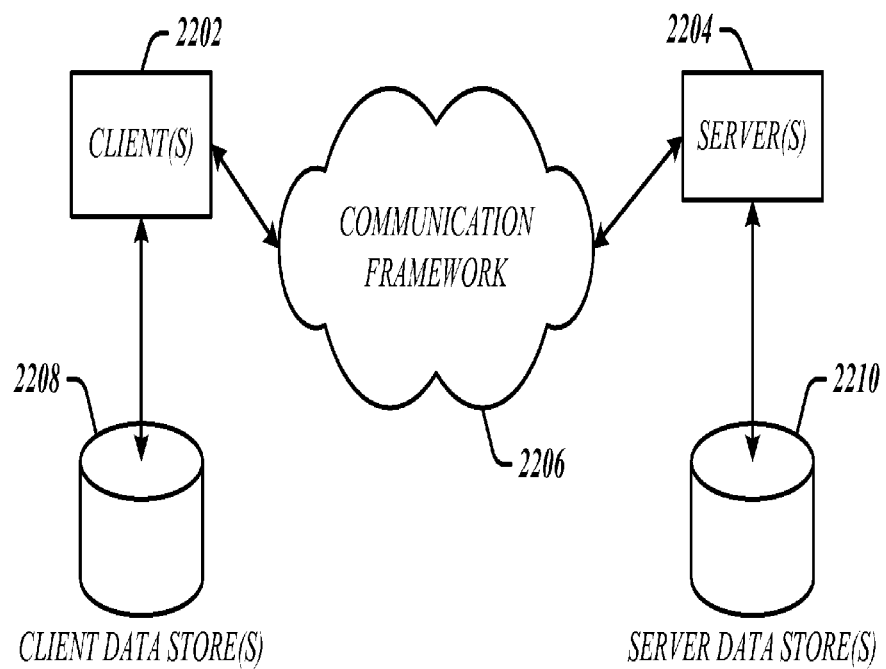
FIG. 22 illustrates one embodiment of a communications architecture.

FIG. 22 illustrates a block diagram of an exemplary communications architecture 2200 suitable for implementing various embodiments as previously described. The communications architecture 2200 includes various common communications elements, such as a transmitter, receiver, transceiver, radio, network interface, baseband processor, antenna, amplifiers, filters, and so forth. The embodiments, however, are not limited to implementation by the communications architecture 2200.

As shown in FIG. 22, the communications architecture 2200 comprises includes one or more clients 2202 and servers 2204. The clients 2202 may implement the client systems 310, 400. The servers 2204 may implement the server system 330. The clients 2202 and the servers 2204 are operatively connected to one or more respective client data stores 2208 and server data stores 2210 that can be employed to store information local to the respective clients 2202 and servers 2204, such as cookies and/or associated contextual information.

The clients 2202 and the servers 2204 may communicate information between each other using a communication framework 2206. The communications framework 2206 may implement any well-known communications techniques and protocols, such as those described with reference to systems 300, 400 and 700. The communications framework 2206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a logic device, at least a portion of which is in hardware;
a preference module operative on the logic device to:
  identify a user of a media processing device,
  monitor activity of the user when using multiple heterogeneous media sources accessible by the media processing device,
  determine implicit viewing preferences of the user from the monitored activity, the implicit viewing preferences to represent user preferences not explicitly defined by the user,
  store the implicit viewing preferences in a user profile for the user, and
  determine personalized content for the user based on the user profile; and a custom channel module to:
  present an alert to the user during presentation of a second program, the alert to be presented responsive to a first program of the personalized content becoming available, and
  record the first program responsive to receiving a rejection of the first program.

2. The apparatus of claim 1, the preference module comprising an identification module operative on the logic device to automatically identify the user of the media processing device through viewing pattern recognition of the user from viewing information associated with the user.

3. The apparatus of claim 1, the preference module comprising an identification module operative on the logic device to automatically identify the user of the media processing device through device recognition of the user from device information captured by a communications component.

4. The apparatus of claim 1, the preference module comprising an identification module operative on the logic device to automatically identify the user of the media processing device through biometric recognition of the user from biometric information captured by one or more biometric sensors.

5. The apparatus of claim 1, the preference module comprising an identification module operative on the logic device to automatically identify the user of the media processing device through visual recognition of the user from video information captured in one or more video frames of one or more digital video cameras.

6. The apparatus of claim 1, the preference module comprising an identification module operative on the logic device to automatically identify the user of the media processing device through audio recognition of the user from audio information captured by one or more microphones.

7. The apparatus of claim 1, the preference module comprising a monitoring module operative on the logic device to monitor online activity of the user associated with using the multiple heterogeneous media sources accessible by the media processing device, and collect media source information representing one or more media sources selected by the user over a defined time period from the multiple heterogeneous media sources accessible by the media processing device.

8. The apparatus of claim 1, the preference module comprising a monitoring module operative on the logic device to monitor online activity of the user associated with programs provided by the multiple heterogeneous media sources accessible by the media processing device, and collect program information representing one or more programs selected by the user over a defined time period from the multiple heterogeneous media sources accessible by the media processing device.

9. The apparatus of claim 1, the preference module comprising a monitoring module operative on the logic device to monitor online activity of the user associated with programming channels provided by the multiple heterogeneous media sources accessible by the media processing device, and collect programming channel information representing one or more programming channels selected by the user over a defined time period from the multiple heterogeneous media sources accessible by the media processing device.

10. The apparatus of claim 1, the preference module comprising a monitoring module operative on the logic device to monitor online activity of the user associated with web browsing when using the multiple heterogeneous media sources accessible by the media processing device, and collect web browsing information representing web sites selected by the user over a defined time period from the multiple heterogeneous media sources accessible by the media processing device.

11. The apparatus of claim 1, the preference module comprising a monitoring module operative on the logic device to monitor online activity of the user associated with recommendations made using multiple heterogeneous media sources accessible by the media processing device, and collect recommendation information representing recommendations made by the user and published to a web site selected from the multiple heterogeneous media sources accessible by the media processing device.

12. The apparatus of claim 1, the preference module comprising a monitoring module operative on the logic device to monitor online activity of a related user associated with the user, and collect related user information representing media sources selected by the related user, programs for a media source selected by the related user, programming channels for a media source selected by the related user, web sites selected by the related user, or recommendations made by the related user and published to a web site.

13. The apparatus of claim 1, the preference module comprising a monitoring module operative on the logic device to monitor online activity of an unrelated user when using multiple heterogeneous media sources accessible by the media processing device, and collect unrelated user information representing recommendations made by the unrelated user and published to a web site.

14. The apparatus of claim 1, the preference module comprising a preference generating module operative to determine implicit viewing preferences of the user from one or more of media source information, program information, programming channel information, web browsing information, recommendation information, related user information, or unrelated user information.

15. The apparatus of claim 1, the preference module operative on the logic device to provide custom viewing recommendations to the user based on the implicit viewing preferences and explicit viewing preferences.

16. A method, comprising:
identifying a user of a media processing device;
monitoring online activity of the user when using multiple heterogeneous media sources accessible by the media processing device;
determining implicit viewing preferences of the user from the monitored activity, the implicit viewing preferences to represent user preferences not explicitly defined by the user;
storing the implicit viewing preferences in a user profile for the user;
determining personalized content for the user based on the user profile;
presenting an alert to the user during presentation of a second program, the alert to be presented responsive to a first program of the personalized content becoming available; and
recording the first program responsive to receiving a rejection of the first program.

17. The method of claim 16, comprising identifying the user of the media processing device based on information associated with the user, the information comprising user credential information, viewing information, device information, biometric information, video information, or audio information.

18. The method of claim 16, comprising collecting media source information representing one or more media sources selected by the user over a defined time period from the multiple heterogeneous media sources accessible by the media processing device.

19. The method of claim 16, comprising collecting program information representing one or more programs selected by the user over a defined time period from the multiple heterogeneous media sources accessible by the media processing device.

20. The method of claim 16, comprising collecting programming channel information representing one or more programming channels selected by the user over a defined time period from the multiple heterogeneous media sources accessible by the media processing device.

21. The method of claim 16, comprising collecting web browsing information representing web sites selected by the user over a defined time period from the multiple heterogeneous media sources accessible by the media processing device.

22. The method of claim 16, comprising collecting recommendation information representing recommendations made by the user and published to a web site selected from the multiple heterogeneous media sources accessible by the media processing device.

23. The method of claim 16, comprising:
monitoring online activity of a related user to the user; and
collecting related user information representing media sources selected by the related user, programs for a media source selected by the related user, programming channels for a media source selected by the related user, web sites selected by the related user, or recommendations made by the related user and published to a web site.

24. The method of claim 16, comprising:
monitoring online activity of an unrelated user; and collecting unrelated user information representing recommendations made by the unrelated user and published to a web site.

25. The method of claim 16, comprising determining implicit viewing preferences of the user from one or more of media source information, program information, programming channel information, web browsing information, recommendation information, related user information, or unrelated user information.

26. The method of claim 16, comprising providing custom viewing recommendations for presentation by a custom interface view on a digital display using the implicit viewing preferences or explicit viewing preferences from the user profile of the user for the media processing device.

27. An article comprising a non-transitory computer-readable storage medium containing instructions that when executed enable a system to:
monitor online activity of a user when using multiple heterogeneous media sources accessible by a media processing device;
determine implicit viewing preferences of the user from the monitored activity, the implicit viewing preferences to represent user preferences not explicitly defined by the user;
determine explicit viewing preferences of the user, the explicit viewing preferences to represent user preferences explicitly defined by the user;
store the implicit viewing preferences and the explicit viewing preferences in a user profile for the user;
determine personalized content for the user based on the user profile;
present an alert to the user during presentation of a second program, the alert to be presented responsive to a first program of the personalized content becoming available; and
record the first program responsive to receiving a rejection of the first program.

28. The article of claim 27, further comprising instructions that when executed enable the system to collect information from the monitored activity, the information comprising media source information, program information, programming channel information, web browsing information, or recommendation information.

29. The article of claim 27, further comprising instructions that when executed enable the system to:
monitor online activity of a related user to the user; and
collect related user information representing media sources selected by the related user, programs for a media source selected by the related user, programming channels for a media source selected by the related user, web sites selected by the related user, or recommendations made by the related user and published to a web site.

30. The article of claim 27, further comprising instructions that when executed enable the system to
monitor online activity of an unrelated user; and
collect unrelated user information representing recommendations made by the unrelated user and published to a web site.

31. The article of claim 27, further comprising instructions that when executed enable the system to determine implicit viewing preferences of the user from one or more of media source information, program information, programming channel information, web browsing information, recommendation information, related user information, or unrelated user information.

32. The article of claim 27, further comprising instructions that when executed enable the system to:
retrieve the implicit viewing preferences and the explicit viewing preferences from the user profile of the user for the media processing device; and
generate a custom interface view using the implicit viewing preferences and the explicit viewing preferences for presentation by an electronic display.

33. The apparatus of claim 1, the custom channel module to receive a response to the alert, the response comprising one of an acceptance of the first program and a rejection of the first program.

34. The apparatus of claim 33, the custom channel module to present the first program to the user responsive to receiving the acceptance of the first program.

35. The apparatus of claim 33, the custom channel module to record the second program responsive to receiving the acceptance of the first program.

36. The method of claim 16, comprising receiving a response to the alert, the response comprising one of an acceptance of the first program and a rejection of the first program.

37. The method of claim 36, comprising presenting the first program to the user responsive to receiving the acceptance of the first program.

38. The method of claim 36, comprising recording the second program responsive to receiving the acceptance of the first program.

* * * * *